(12) United States Patent
Zhang et al.

(10) Patent No.: US 11,979,877 B2
(45) Date of Patent: May 7, 2024

(54) TECHNIQUES FOR INDICATING DOWNLINK POWER ADJUSTMENTS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/493,540

(22) Filed: Oct. 4, 2021

(65) Prior Publication Data

US 2023/0107353 A1 Apr. 6, 2023

(51) Int. Cl.
*H04W 52/36* (2009.01)
*H04W 72/044* (2023.01)
*H04W 72/1273* (2023.01)
*H04W 72/542* (2023.01)

(52) U.S. Cl.
CPC ..... *H04W 72/1273* (2013.01); *H04W 52/367* (2013.01); *H04W 72/0473* (2013.01); *H04W 72/542* (2023.01)

(58) Field of Classification Search
None
See application file for complete search history.

(56) References Cited

U.S. PATENT DOCUMENTS

| | | | | |
|---|---|---|---|---|
| 2012/0282889 A1* | 11/2012 | Tanaka | ............ | H04W 24/02 455/405 |
| 2016/0330011 A1* | 11/2016 | Lee | ............ | H04W 52/10 |
| 2021/0091918 A1* | 3/2021 | Lee | ............ | H04L 5/1461 |
| 2022/0183017 A1* | 6/2022 | Wu | ............ | H04B 17/309 |

FOREIGN PATENT DOCUMENTS

| | | |
|---|---|---|
| EP | 3739970 A1 | 11/2020 |
| WO | WO-2020199066 A1 * | 10/2020 |
| WO | WO-2021035457 A1 | 3/2021 |

OTHER PUBLICATIONS

International Search Report and Written Opinion—PCT/US2022/039561—ISA/EPO—dated Nov. 22, 2022.

* cited by examiner

*Primary Examiner* — Jenkey Van
(74) *Attorney, Agent, or Firm* — Holland & Hart LLP

(57) ABSTRACT

Methods, systems, and devices for wireless communications are described. A base station may reduce a transmission power of a scheduled downlink message relative to an expected transmission power of the scheduled downlink message in response to determining that the scheduled downlink message will cause at least a threshold level of interference with a concurrently scheduled uplink message. The base station may transmit the scheduled downlink message to a user equipment (UE) using the reduced transmission power and may transmit, to the UE an indication of a power adjustment for a downlink measurement of the scheduled downlink message. The UE may receive the indication after receiving the scheduled downlink message and may adjust the downlink measurement in accordance with the indication of the power adjustment.

30 Claims, 17 Drawing Sheets

TECHNIQUES FOR INDICATING DOWNLINK POWER ADJUSTMENTS

TECHNICAL FIELD

The following relates to wireless communications, including techniques for indicating downlink power adjustments.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support half-duplex communications and full-duplex communications between communication devices (for example, between a UE and a base station). In some cases, however, a communication device, such as a base station, performing full-duplex communications may experience self-interference due to the concurrent communication of uplink messages and downlink messages, which can reduce a reliability of the full-duplex communications. For example, the base station may reduce a transmission power of a downlink message that is to be communicated concurrently with an uplink message to reduce the self-interference experienced at the base station. The reduction in transmission power for the downlink message, however, may be unknown to the UE, which may cause the UE, in some cases, to incorrectly determine that beam failure has occurred or that the downlink message has suffered an increased level of pathloss, among other examples. The UE may, because of the incorrect determination, make unnecessary adjustments or take other corrective actions.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may include determining that a scheduled downlink message to a user equipment (UE) will cause at least a threshold level of interference with an uplink message scheduled to be received at the base station concurrently with transmitting the scheduled downlink message, transmitting, to the UE, the scheduled downlink message using a reduced transmission power relative to an expected transmission power associated with the scheduled downlink message based at least in part on the determining, and transmitting, to the UE after transmitting the scheduled downlink message, an indication of a power adjustment for a downlink measurement associated with the scheduled downlink message based at least in part on transmitting the scheduled downlink message using the reduced transmission power.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to determine that a scheduled downlink message to a UE will cause at least a threshold level of interference with an uplink message scheduled to be received at the base station concurrently with transmitting the scheduled downlink message, transmit, to the UE, the scheduled downlink message using a reduced transmission power relative to an expected transmission power associated with the scheduled downlink message based at least in part on the determining, and transmit, to the UE after transmitting the scheduled downlink message, an indication of a power adjustment for a downlink measurement associated with the scheduled downlink message based at least in part on transmitting the scheduled downlink message using the reduced transmission power.

Another innovative aspect of the subject matter described in this disclosure can be implemented in an apparatus for wireless communication. The apparatus may include means for determining that a scheduled downlink message to a UE will cause at least a threshold level of interference with an uplink message scheduled to be received at the base station concurrently with transmitting the scheduled downlink message, means for transmitting, to the UE, the scheduled downlink message using a reduced transmission power relative to an expected transmission power associated with the scheduled downlink message based at least in part on the determining, and means for transmitting, to the UE after transmitting the scheduled downlink message, an indication of a power adjustment for a downlink measurement associated with the scheduled downlink message based at least in part on transmitting the scheduled downlink message using the reduced transmission power.

Another innovative aspect of the subject matter described in this disclosure can be implemented in a non-transitory computer-readable medium for wireless communication. The non-transitory computer-readable medium storing code for wireless communication at a base station is described. The code may include instructions executable by a processor to determine that a scheduled downlink message to a UE will cause at least a threshold level of interference with an uplink message scheduled to be received at the base station concurrently with transmitting the scheduled downlink message, transmit, to the UE, the scheduled downlink message using a reduced transmission power relative to an expected transmission power associated with the scheduled downlink message based at least in part on the determining, and transmit, to the UE after transmitting the scheduled downlink message, an indication of a power adjustment for a downlink measurement associated with the scheduled downlink message based at least in part on transmitting the scheduled downlink message using the reduced transmission power.

One innovative aspect of the subject matter described in this disclosure can be implemented in a method for wireless communication. The method may include receiving, from a base station, a downlink message having a reduced transmission power relative to an expected transmission power associated with the downlink message, receiving, from the base station and after receiving the downlink message, an indication of a power adjustment for a downlink measurement associated with the downlink message based at least in part on the downlink message having the reduced transmission power, and adjusting the downlink measurement in accordance with the indication of the power adjustment for the downlink measurement.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to receive, from a base station, a downlink message having a reduced transmission power relative to an expected transmission power associated with the downlink message, receive, from the base station and after receiving the downlink message, an indication of a power adjustment for a downlink measurement associated with the downlink message based at least in part on the downlink message having the reduced transmission power, and adjust the downlink measurement in accordance with the indication of the power adjustment for the downlink measurement.

Another innovative aspect of the subject matter described in this disclosure can be implemented in an apparatus for wireless communication. The apparatus may include means for receiving, from a base station, a downlink message having a reduced transmission power relative to an expected transmission power associated with the downlink message, means for receiving, from the base station and after receiving the downlink message, an indication of a power adjustment for a downlink measurement associated with the downlink message based at least in part on the downlink message having the reduced transmission power, and means for adjusting the downlink measurement in accordance with the indication of the power adjustment for the downlink measurement.

Another innovative aspect of the subject matter described in this disclosure can be implemented in a non-transitory computer-readable medium for wireless communication. The non-transitory computer-readable medium storing code for wireless communication at a UE is described. The code may include instructions executable by a processor to receive, from a base station, a downlink message having a reduced transmission power relative to an expected transmission power associated with the downlink message, receive, from the base station and after receiving the downlink message, an indication of a power adjustment for a downlink measurement associated with the downlink message based at least in part on the downlink message having the reduced transmission power, and adjust the downlink measurement in accordance with the indication of the power adjustment for the downlink measurement.

DETAILED DESCRIPTION

Figure 1:
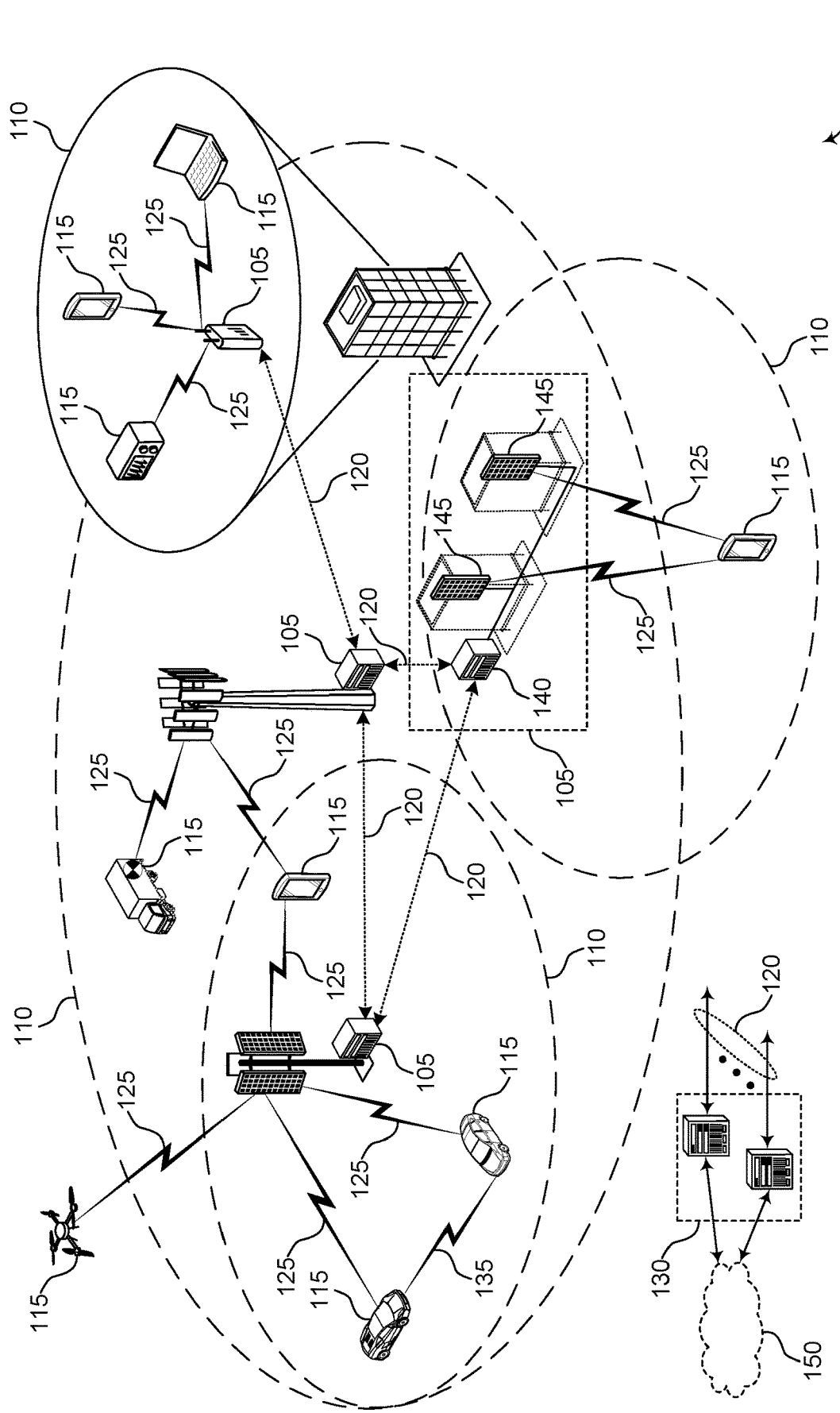
FIGS. 1 and 2 illustrate examples of wireless communications systems that support procedures for indicating downlink power adjustments in accordance with aspects of the present disclosure.

Some wireless communications devices (for example, a base station, a user equipment (UE)) may support half-duplex and full-duplex wireless communications. To support half-duplex communications, a communication device may be configured to transmit or receive in one direction at a time (for example, uplink or downlink). To support full-duplex communications, the communication device may be configured to transmit and receive communications concurrently (for example, concurrently or simultaneously communicate downlink and uplink). In some cases, a communication device, such as a base station, performing full-duplex communications may experience self-interference, for example, due to concurrently receiving one or more uplink messages and transmitting one or more downlink messages, which may reduce a reliability of the uplink messages, the downlink messages, or both. Based on the self-interference, among other factors, the base station may reduce a transmission power of a downlink message to reduce the self-interference experienced. However, the reduction in transmission power may be unknown to the UE, and the reduction in the transmission power may cause the UE, in some cases, to incorrectly determine, for example, that beam failure has occurred or that the downlink message has suffered an increased level of pathloss, among other examples.

Various aspects generally relate to supporting dynamic power reductions to downlink messages while operating in a full-duplex mode. Some aspects more specifically relate to indicating power adjustments to downlink measurements of such downlink messages after transmission of the downlink messages. Upon receiving an indication of the power adjustments to the downlink measurements, a UE may retroactively apply the power adjustments to its measurements of the previously-received downlink messages. For example, while operating in a full-duplex mode, a base station may determine that a downlink message to one UE is concurrently-scheduled (for example, configured) with uplink message to be transmitted from the same or a different UE (for example, the base station may determine that the scheduled downlink message will cause at least a threshold level of interference to the scheduled uplink message). In response, the base station may reduce a transmission power (for example, from an expected or initial transmission power to a reduced transmission power) of the scheduled downlink message to reduce the self-interference, and may transmit the scheduled downlink message to the UE using the reduced transmission power. After transmitting the scheduled downlink message, the base station may transmit, to the UE, an indication of a power adjustment for a downlink measurement of the scheduled downlink message. For example, the base station may indicate an adjustment to a reference signal received power (RSRP) measurement of the scheduled downlink message corresponding to the reduced transmission power or may indicate a new reference-signal (RS)-energy-per-resource-element (EPRE)-to-physical-downlink-shared-channel (PDSCH)-EPRE ratio (for example, a demodulation-reference-signal (DMRS)-EPRE-to-PDSCH-EPRE ratio or a phase-tracking-reference-signal (PTRS) EPRE-to-PDSCH-EPRE ratio) for the UE to use in channel estimation associated with the received downlink message. In such examples, the UE may receive the indication of the power adjustment and retroactively adjust the downlink measurement according to the indicated power adjustment.

Particular aspects of the subject matter described in this disclosure may be implemented to realize one or more of the following potential advantages. The operations performed by the described communication devices may increase a reliability of full-duplex communications by reducing a transmission power of downlink messages, which will reduce self-interference experienced at a base station. More specifically, in some implementations, reducing the transmission power may be part of increasing the reliability of concurrently-received downlink and uplink messages based on reducing self-interference. Additionally, operations performed by the described communication devices by transmitting an indication of a power adjustment to a UE, the base station may enable a communication device, such as the UE, to adjust downlink measurements of the downlink messages to more effectively compensate for the reduced transmission power. For instance, a UE may increase a measured RSRP of the downlink message to compensate for the reduced transmission power of the downlink message and to avoid improper beam failure detection or pathloss measurement. Additionally, or alternatively, a UE may perform channel estimation using an indicated reference-signal-EPRE-to-PDSCH-EPRE ratio that compensates for the reduced transmission power of the downlink message and enables proper channel estimation. In some implementations, the operations performed by the described communication devices to indicate and adjust for reduced transmission powers may reduce (for example, prevent) unnecessary triggering of otherwise-initiated compensation procedures (for example, beam failure detection procedures, beam failure recovery procedures, radio link management procedures, uplink power boosting, among other compensation procedures) by the UE, which may improve data rates, spectral efficiency, resource efficiency and utilization, latency, power consumption, and battery life, among other examples.

Aspects of the disclosure are initially described in the context of wireless communications systems. Aspects of the disclosure are additionally described in the context of a communication sequence and a process flow. Aspects of the disclosure are further illustrated by and described with reference to apparatus diagrams, system diagrams, and flowcharts that relate to procedures for indicating downlink power adjustments.

FIG. 1 illustrates an example of a wireless communications system 100 that supports procedures for indicating downlink power adjustments in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support half-duplex communications and full-duplex communications between various base stations 105 and UEs 115. For example, a UE 115 may support concurrently (for example, simultaneously) receiving downlink messages from a first base station 105 and transmitting uplink messages to a second base station 105. Additionally, or alternatively, a base station 105 may support concurrently receiving uplink messages from a first UE 115 and transmitting downlink messages to a second UE 115. Additionally, or alternatively, a base station 105 and a UE 115 may support concurrently communicating downlink messages and uplink messages with each other. In some examples, a base station 105 and a UE 115 may perform full-duplex communications using multiple antenna panels. For example, a base station 105 or a UE 115 may communicate downlink messages using a first antenna panel and may communicate uplink messages using a second antenna panel.

Full-duplex communications may increase throughput and spectral efficiency and reduce latency relative to half-duplex communications, for example, due to concurrently communicating uplink and downlink messages rather than sequentially communicating uplink and downlink messages. However, in some cases, full-duplex communications may be associated with increased levels of self-interference (for example, caused by clutter echo) at a base station 105 or a UE 115, which may reduce a reliability of the full-duplex communications. For example, self-interference may result from reflected transmitted signals interfering with received signals at the base station 105 or the UE 115. For instance, a transmitted signal may reflect off of a surrounding object and echo back to the base station 105 or the UE 115, which may interfere with another signal received by the base station 105 or the UE 115.

In some examples, a base station 105 may reduce self-interference by reducing a transmission power of a downlink message transmitted while operating in a full-duplex mode. In some cases, the base station 105 may have insufficient time or resources (or both) to notify a UE 115 that received the downlink message of the transmission power reduction prior to transmitting the downlink message. Therefore, the reduction in transmission power may be unknown to the UE 115, which may cause the UE 115, in some cases, to incorrectly determine that beam failure has occurred or that the downlink message has suffered an increased level of pathloss, among other negative assumptions. In some cases, the UE 115 may unnecessarily trigger a compensation procedure, such as a beam failure detection procedure, a beam failure recovery procedure, a radio link management procedure, or uplink power boosting, among other compensation procedures, in response to unknowingly receiving the downlink message at the reduced transmission power, which may reduce resources utilization and efficiency, increase latency, and increase power consumption due to performing the compensation procedures.

Various aspects of the described techniques support dynamic downlink power control for full-duplex communications and downlink power adjustment indications to reduce self-interference and increase reliability associated with full-duplex communications, among other benefits. For example, a base station 105 may reduce a transmission power of a scheduled downlink message (for example, from an expected or initial transmission power that the base station 105 may otherwise use for transmitting a downlink message to a reduced transmission power) in response to determining that the scheduled downlink message will cause at least a threshold level of interference (for example, self-interference) to a concurrently scheduled uplink message to be received at the base station 105. Reducing the transmission power of the scheduled downlink message may reduce the interference caused by the scheduled downlink message and increase a reliability of the scheduled uplink message. The base station 105 may transmit the scheduled downlink message to a first UE 115 using the reduced transmission power and may receive the scheduled uplink message from a second UE 115 (for example, a different UE 115, the first UE 115). In some examples, the expected or initial transmission power that the base station 105 may reduce may be a default transmission power for a downlink transmission, a preconfigured transmission power for a downlink transmission, or a transmission power determined by the base station for a downlink transmission.

After transmitting the scheduled downlink message, the base station 105 may transmit, to the first UE 115, an indication of a power adjustment for a downlink measurement of the scheduled downlink message. For example, the base station 105 may indicate an adjustment to an RSRP measurement of the scheduled downlink message corresponding to the reduced transmission power or may indicate a new reference signal EPRE to PDSCH EPRE ratio for the first UE 115 to use in channel estimation associated with the scheduled downlink message. The first UE 115 may receive the indication of the power adjustment and may (for example, retroactively) adjust the downlink measurement according to the indication of the power adjustment. Based on adjusting the downlink measurement, the first UE 115 may refrain from triggering any unnecessary compensation procedures associated with receiving the scheduled downlink message at the reduced transmission power.

Figure 2:
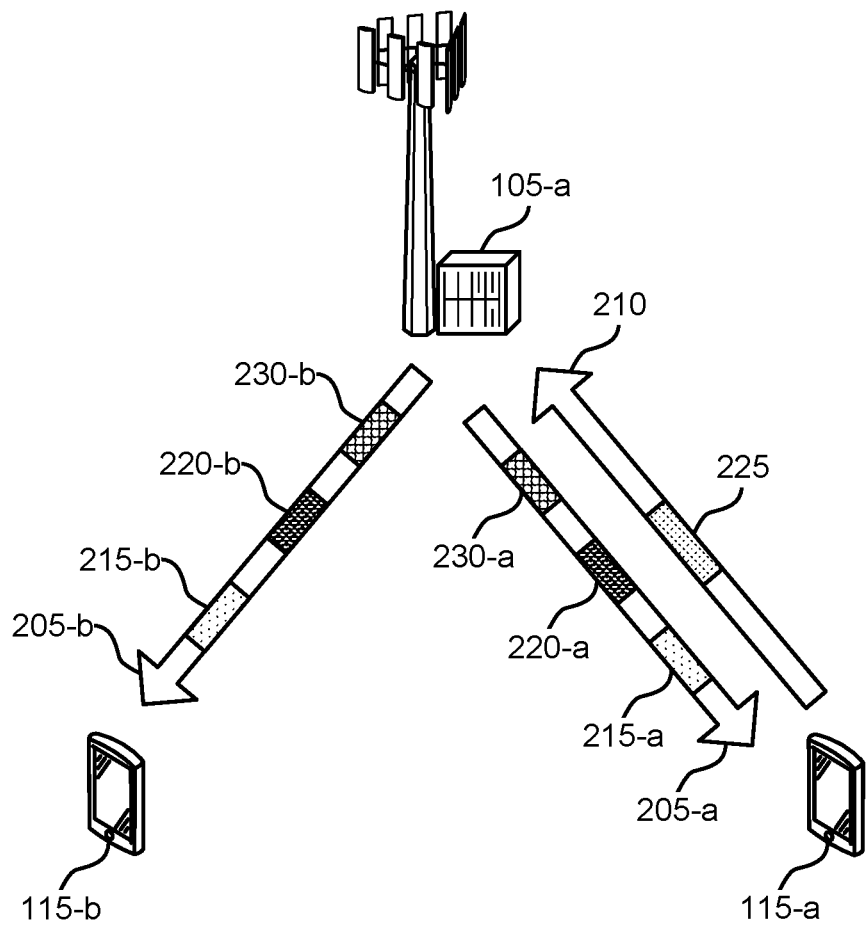
Figure 2:
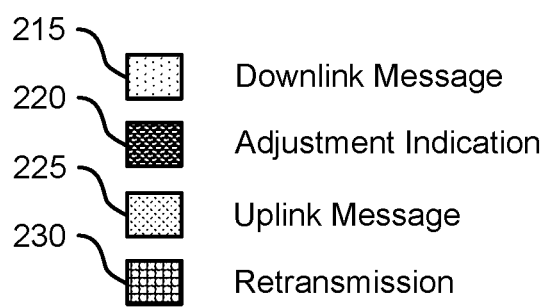

FIG. 2 illustrates an example of a wireless communications system 200 that supports procedures for indicating downlink power adjustments in accordance with aspects of the present disclosure. The wireless communications system 200 may implement or may be implemented by aspects of the wireless communications system 100. For example, the wireless communications system 200 may include a base station 105-a, a UE 115-a, and a UE 115-b, which may be examples of the corresponding devices described with reference to FIG. 1. In some examples, the wireless communications system 200 may support multiple radio access technologies including fourth generation (4G) systems such as LTE systems, LTE-A systems, or LTE-A Pro systems, and 5G systems which may be referred to as NR systems. The wireless communications system 200 may support dynamic downlink power adjustments associated with full-duplex communications, which may provide improvements to reliability, data rates, spectral efficiency, latency, power consumption, resource utilization, coordination between devices, processing, and battery life, among other benefits.

The wireless communications system 200 may support communications between the base station 105-a and the UE 115-a, and between the base station 105-a and the UE 115-b. For example, the base station 105-a may transmit downlink messages to the UE 115-a over a channel 205-a and to the UE 115-b over a channel 205-b, each of which may be examples of a communication link 125 described with reference to FIG. 1. In some examples, the channels 205 may examples of a physical downlink channel, such as a physical downlink control channel (PDCCH), a PDSCH, a physical random access channel (PRACH), a physical broadcast channel (PBCH), or some other physical downlink channel. The UE 115-a may transmit uplink messages to the base station 105-a over a channel 210, which may be an example of a communication link 125. In some examples, the channel 210 may be an example of a physical uplink channel, such as a physical uplink control channel (PUCCH), a physical uplink shared channel (PUSCH), a PRACH, or some other physical uplink channel.

The wireless communications system 200 may support half-duplex communications and full-duplex communications. For example, the base station 105-a, the UE 115-a, and the UE 115-b may operate in a half-duplex mode or a full-duplex mode. In the half-duplex mode, the base station 105-a may sequentially transmit downlink messages to the UEs 115 and receive uplink messages from the UEs 115, and the UEs 115 may sequentially transmit uplink messages to the base station 105-a and receive downlink messages from the base station 105-a. In the full-duplex mode, the base station 105-a and the UEs 115 may concurrently (for example, simultaneously) communicate uplink messages and downlink messages. In some examples, one or multiple of the base station 105-a, the UE 115-a, and the UE 115-b may operate in the full-duplex mode at a same time. For example, the base station 105-a may operate in the full-duplex mode while the UE 115-a and the UE 115-b operate in the half-duplex mode. Alternatively, the base station 105-a may operate in the half-duplex mode, and one or both of the UE 115-a and the UE 115-b may operate in the full-duplex mode (for example, by concurrently communicating with another base station 105 (not shown)). Alternatively, both the base station 105-a and one or more of the UE 115-a and the UE 115-b may operate in the full-duplex mode in some examples.

The base station 105-a may support dynamic downlink power adjustments while operating in a full-duplex mode to reduce self-interference associated with operating in the full-duplex mode. For example, the base station 105-a may determine a level of self-interference experienced at the base station 105-a while performing full-duplex communications. In some examples, the base station 105-a may calculate the level of self-interference between different beams (for example, between a transmit beam and a receive beam, between a downlink beam and an uplink beam) by measuring reference signals (for example, sounding reference signals (SRSs), synchronization signal blocks (SSBs)) communicated using the different beams. In some examples, the base station 105-a may determine the level of self-interference based on previous self-interference measurements. For example, the base station 105-a may (for example, periodically) measure the level of self-interference caused by a downlink message to a concurrently received uplink message (for example, based on an RSRP measurement of the uplink message) and may determine that a level of self-interference between one or more subsequent downlink messages and uplink messages concurrently communicated using same beams may be the same or similar to the previously measured level of self-interference.

The base station 105-a may reduce a transmission power (for example, from an expected or initial transmission power that the base station 105 may otherwise use for transmitting a downlink message to a reduced transmission power) of a downlink message 215 based on a determined (for example, detected) level of self-interference. For example, the base station 105-a may operate in the full-duplex mode and may determine (for example, detect) that a downlink message 215 scheduled to be concurrently communicated with an uplink message 225 (for example, a downlink message 215-a transmitted to the UE 115-a concurrently with receiving the uplink message 225 from the UE 115-a, a downlink message 215-b transmitted to the UE 115-b concurrently with receiving the uplink message 225 from the UE 115-a) will cause at least a threshold level of interference to the uplink message 225 (for example, being transmitted at a configured or expected transmission power associated with the downlink message 215). For instance, the uplink message 225 may be a URLLC uplink message that is associated with reliability constraints, and the base station 105-a may determine that transmitting the downlink message 215 using the configured transmission power, such as an expected transmission power, will cause interference, for example, such that the reliability constraints associated with the uplink message 225 may fail to be satisfied. In response to determining that the downlink message 215 will cause at least the threshold level of interference, the base station 105-a may reduce the transmission power of the downlink message 215 relative to the configured transmission power, such as an expected transmission power, (for example, to reduce the level of interference such that the reliability constraints associated with the uplink message 225 are satisfied) and may transmit the downlink message 215 to the UE 115-a or the UE 115-b (for example, the downlink message 215-a to the UE 115-a, the downlink message 215-b to the UE 115-b).

After transmitting the downlink message 215, the base station 105-a may transmit (for example, in a second message separate from the downlink message 215) an adjustment indication 220 that indicates a power adjustment for a downlink measurement associated with the downlink message 215. For example, the base station 105-a may transmit an adjustment indication 220-a to the UE 115-a after transmitting the downlink message 215-a or may transmit an adjustment indication 220-b to the UE 115-b after transmitting the downlink message 215-b. For instance, in some examples, the base station 105-a may have insufficient time or resources (or both) to transmit the adjustment indication 220 between determining that the downlink message 215 will cause at least the threshold level of interference and transmitting the downlink message 215. As a result, the base station 105-a may transmit the adjustment indication 220 after transmitting the downlink message 215, and the UE 115 may (for example, retroactively) apply the indicated power adjustment to the downlink measurement in order to properly decode the downlink message 215 in accordance with the reduced transmission power. In some examples, the base station 105-a may transmit the adjustment indication 220 in downlink control information (DCI) or a MAC-control element (MAC-CE).

In some examples, the adjustment indication 220 may indicate a first value of a transmission power reduction from the configured transmission power, such as an expected transmission power, to the reduced transmission power. For example, in examples in which the base station 105-a reduces the transmission power by a magnitude of X decibels (dB), the adjustment indication 220 may indicate the first value as a −X dB reduction in power from the configured transmission power, such as an expected transmission power, to the reduced transmission power. In some examples, indicating the first value of the transmission power reduction may indicate for the UE 115-a or the UE 115-b to increase an RSRP measurement of one or more reference signals within the downlink message 215 by the magnitude of the first value. For example, indicating the first value of the transmission power reduction may indicate for the UE 115-a or the UE 115-b to increase the RSRP measurement by X dB to compensate for the transmission power reduction of −X dB.

In some examples, the adjustment indication 220 may indicate a second value of the reduced transmission power. For example, the adjustment indication 220 may indicate that the reduced transmission power is Y dB, and the UE 115-a or the UE 115-b may calculate the first value of the transmission power reduction (for example, −X dB) using the second value of the reduced transmission power and a value of the configured transmission power, and may adjust to the reduced transmission power.

In some examples, the adjustment indication 220 may indicate a third value by which the UE 115-a or the UE 115-b are to increase the downlink measurement. For example, the adjustment indication 220 may indicate that the UE 115-a or the UE 115-b are to increase the RSRP measurement of the one or more reference signals within the downlink message 215 by the third value. A magnitude of the third value may correspond to a magnitude of the transmission power reduction. For example, in examples in which the base station 105-a reduces the transmission power by the magnitude of X dB, the adjustment indication 220 may indicate the third value as an X dB increase to the RSRP measurement of the one or more reference signals.

In some examples, the adjustment indication 220 may indicate whether the base station 105-a canceled the transmission of the downlink message 215. For example, in some implementations, the base station 105-a may cancel the transmission of the downlink message 215 in response to determining that the downlink message 215 will cause at least the threshold level of interference to the uplink message 225. Here, the adjustment indication 220 may indicate that the base station 105-a canceled the transmission of the downlink message 215 by indicating a transmission power reduction of the downlink message 215 by at least a threshold power (for example, a transmission power reduction of −80 dB, −100 dB, or some other threshold transmission power reduction). The transmission power reduction of the downlink message 215 by at least the threshold power may indicate to the UE 115-a or the UE 115-b a transmission power reduction of negative infinity, or in other words, a cancellation of the transmission of the downlink message 215. Alternatively, the base station 105-a may transmit the downlink message 215 at the reduced transmission power, and the adjustment indication 220 may indicate a transmission power reduction of the downlink message 215 by a value less than the threshold power. The transmission power reduction of the downlink message 215 by the value less than the threshold power may indicate to the UE 115-a or the UE 115-b that the base station 105-a did transmit the downlink message 215, but at the reduced transmission power.

In some examples, the adjustment indication 220 may indicate an adjustment to a reference-signal-EPRE-to-PDSCH-EPRE ratio (for example, a DMRS-EPRE-to-PDSCH-EPRE ratio, a PTRS-EPRE-to-PDSCH-EPRE ratio) for use in channel estimation by the UE 115-a or the UE 115-b that is based on the downlink message 215. For instance, in some examples, the base station 105-a may reduce a transmission power of a PDSCH portion of the downlink message 215 and may maintain the configured transmission power, such as an expected transmission power, for remaining portions of the downlink message 215 (for example, a PDCCH portion, a PRACH portion, a PBCH portion, among other downlink channel portions that may be included in the downlink message 215). To enable proper channel estimation of the downlink message 215, the adjustment indication 220 may indicate the reduction to the transmission power of the PDSCH portion, for example, by indicating the adjustment to the reference-signal-EPRE-to-PDSCH-EPRE ratio.

In some examples, to indicate the adjustment to the reference-signal-EPRE-to-PDSCH-EPRE ratio, the adjustment indication 220 may indicate a new (for example, larger) reference-signal-EPRE-to-PDSCH-EPRE ratio that the UE 115-a or the UE 115-b is to use in performing the channel estimation. The new reference-signal-EPRE-to-PDSCH-EPRE ratio may be different than a reference-signal-EPRE-to-PDSCH-EPRE ratio (for example, originally) configured for the downlink message 215 (for example, corresponding to a configured transmission power of the PDSCH portion of the downlink message 215 prior to the transmission power reduction of the PDSCH portion). In some implementations, the adjustment indication 220 may indicate the new reference-signal-EPRE-to-PDSCH-EPRE ratio from a set of reference-signal-EPRE-to-PDSCH-EPRE ratios that includes at least the new reference-signal-EPRE-to-PDSCH-EPRE ratio and the reference-signal-EPRE-to-PDSCH-EPRE ratio configured for the downlink message 215. For example, the set of reference-signal-EPRE-to-PDSCH-EPRE ratios may be included in a table of reference-signal-EPRE-to-PDSCH-EPRE ratios, and the adjustment indication 220 may indicate an index of the new reference-signal-EPRE-to-PDSCH-EPRE ratio within the table.

In some examples, to indicate the adjustment to the reference-signal-EPRE-to-PDSCH-EPRE ratio, the adjustment indication 220 may indicate an offset of the reference-signal-EPRE-to-PDSCH-EPRE ratio configured for the downlink message 215. For instance, in some examples, a reference-signal-EPRE-to-PDSCH-EPRE ratio of a downlink message 215 may be fixed, and the reference-signal-EPRE-to-PDSCH-EPRE ratio configured for the downlink message 215 may correspond to the fixed reference-signal-EPRE-to-PDSCH-EPRE ratio. The adjustment indication 220 may indicate the offset by which the UE 115-a or the UE 115-b are to adjust (for example, increase or decrease) the fixed reference-signal-EPRE-to-PDSCH-EPRE ratio.

In some examples, to indicate the adjustment to the reference-signal-EPRE-to-PDSCH-EPRE ratio, the adjustment indication 220 may indicate a value to be used by the UE 115-a or the UE 115-b in determining the new reference-signal-EPRE-to-PDSCH-EPRE ratio. For example, the adjustment indication 220 may indicate a new value of a reference signal EPRE while a value of a PDSCH EPRE remains the same, and the UE 115-a or the UE 115-b may calculate the new reference-signal-EPRE-to-PDSCH-EPRE ratio using the new value of the reference signal EPRE and the value of the PDSCH EPRE. Alternatively, the adjustment indication 220 may indicate a new value of the PDSCH EPRE while a value of the reference signal EPRE remains the same, and the UE 115-a or the UE 115-b may calculate the new reference-signal-EPRE-to-PDSCH-EPRE ratio using the value of the reference signal EPRE and the new value of the PDSCH EPRE.

In some examples, the adjustment indication 220 may indicate which resource occasions are associated with the power adjustment for the downlink measurement. For example, the adjustment indication 220 may indicate a quantity of most recent resource occasions prior to the transmission of the adjustment indication 220 over which the UE 115-a or the UE 115-b are to apply the power adjustment for the downlink measurement. In some implementations, the adjustment indication 220 may indicate over which resource occasions of the quantity of most recent resource occasions the UE 115-a or the UE 115-b are to apply the power adjustment for the downlink measurement.

The UE 115-a or the UE 115-b may adjust the downlink measurement in accordance with the adjustment indication 220. For example, the UE 115-a or the UE 115-b may adjust (for example, increase) the RSRP measurement of the one or more reference signals within the downlink message 215 or may adjust the reference-signal-EPRE-to-PDSCH-EPRE ratio in accordance with the adjustment indication 220 and over the resource occasions indicated by the adjustment indication 220.

In some examples, the UE 115-a and the UE 115-b may perform channel estimation based on adjusting the downlink measurement. For example, the UE 115-a or the UE 115-b may apply the new reference-signal-EPRE-to-PDSCH-EPRE ratio in performing the channel estimation using the downlink message 215. In some implementations, the UE 115-a or the UE 115-b may have insufficient time to decode the adjustment indication 220 and apply the new reference-signal-EPRE-to-PDSCH-EPRE ratio in the performance of the channel estimation. Here, the UE 115-a or the UE 115-b may apply the new reference-signal-EPRE-to-PDSCH-EPRE ratio in performing channel estimation using one or more retransmissions 230 of the downlink message 215. For example, the base station 105-a may transmit a retransmission 230-a of the downlink message 215-a to the UE 115-a or may transmit a retransmission 230-b of the downlink message 215-b to the UE 115-b. To support proper channel estimation, the UE 115-a or the UE 115-b may combine channel estimation of the retransmissions 230 using the new reference-signal-EPRE-to-PDSCH-EPRE ratio with the channel estimation of the downlink messages 215 using the previous (for example, configured) reference-signal-EPRE-to-PDSCH-EPRE ratio.

By adjusting the downlink measurement, the UE 115-a or the UE 115-b may refrain from triggering a compensation procedure associated with receiving the downlink message 215 at the reduced transmission power. For example, the UE 115-a or the UE 115-b may compensate for the reduced transmission power by adjusting the downlink measurement, which may prevent the improper assumption of a beam failure, a high pathloss, or poor channel quality (or some combination thereof), and prevent the triggering of resulting compensation procedures corresponding to the improper assumptions.

Figure 3:
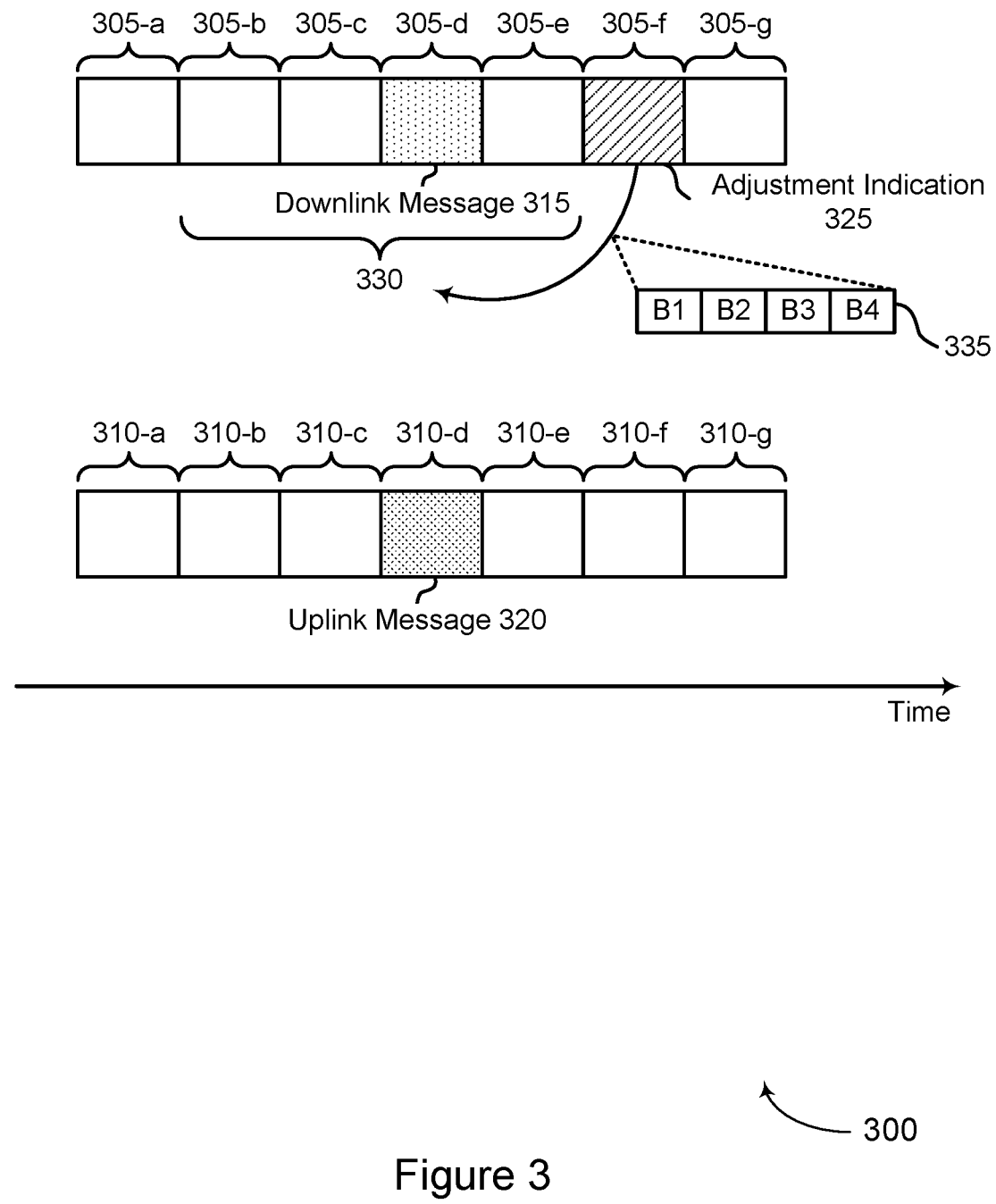
FIG. 3 illustrates an example of a communication sequence that supports procedures for indicating downlink power adjustments in accordance with aspects of the present disclosure.

FIG. 3 illustrates an example of a communication sequence 300 that supports procedures for indicating downlink power adjustments in accordance with aspects of the present disclosure. In some examples, the communication sequence 300 may be implemented by aspects of the wireless communications systems 100 and 200 as described with reference to FIGS. 1 and 2. For example, the communication sequence 300 may be implemented by a base station 105 and a UE 115 as described with reference to FIGS. 1 and 2 to support dynamic downlink power adjustments for full-duplex communications.

The communication sequence 300 depicts downlink resource occasions 305 and uplink resource occasions 310 configured for the base station 105. For example, the communication sequence 300 depicts a downlink resource occasion 305-a, a downlink resource occasion 305-b, a downlink resource occasion 305-c, a downlink resource occasion 305-d, a downlink resource occasion 305-e, a downlink resource occasion 305-f, and a downlink resource occasion 305-g that may each correspond to a resource occasion over which the base station 105 may transmit downlink messages to one or more UEs 115. Additionally, the communication sequence 300 depicts an uplink resource occasion 310-a, an uplink resource occasion 310-b, an uplink resource occasion 310-c, an uplink resource occasion 310-d, an uplink resource occasion 310-e, an uplink resource occasion 310-f, and an uplink resource occasion 310-g that may each correspond to a resource occasion over which the base station 105 may receive uplink messages from the one or more UEs 115. The downlink resource occasions 305 may overlap in time with the uplink resource occasions 310, and concurrent downlink messages and uplink messages communicated over overlapping downlink resource occasions 305 and uplink resource occasions 310 may be full-duplex communications performed by the base station 105.

In the examples of FIG. 3, the base station 105 may be configured (for example, scheduled) to concurrently transmit a downlink message 315 to a first UE 115 over the downlink resource occasion 305-d and receive an uplink message 320 from a second UE 115 (for example, the first UE 115 or a different UE 115) over the uplink resource occasion 310-d that at least partially overlaps in time with the downlink resource occasion 305-d. In some examples, the base station 105 may determine that the downlink message 315 will cause at least a threshold level of interference to the uplink message 320 and may transmit the downlink message 315 at a reduced transmission power relative to a configured transmission power, such as an expected transmission power, for the downlink message 315 in order to reduce the level of interference caused to the uplink message 320 and increase a likelihood that the base station 105 properly decodes the uplink message 320.

At some time after transmitting the downlink message 315, the base station 105 may transmit an adjustment indication 325, which may be an example of an adjustment indication 220 described with reference to FIG. 2. For example, the base station 105 may transmit the adjustment indication over the downlink resource occasion 305-f to indicate a power adjustment for a downlink measurement associated with the downlink message 315 (for example, an RSRP measurement of one or more reference signals within the downlink message 315, a reference-signal-EPRE-to-PDSCH-EPRE ratio associated with the downlink message 315).

The adjustment indication 325 may indicate over which downlink resource occasions 305 for the first UE 115 to (for example, retroactively) apply the power adjustment for the downlink measurement. In some examples, the adjustment indication 325 may indicate a quantity of most recent downlink resource occasions 330 prior to the transmission of the adjustment indication 325. In the examples of FIG. 3, the adjustment indication 325 may indicate the four most recent downlink resource occasions 305 prior to the transmission of adjustment indication over the downlink resource occasion 305-f, which include the downlink resource occasion 305-b, the downlink resource occasion 305-c, the downlink resource occasion 305-d, and the downlink resource occasion 305-e.

In some implementations, the adjustment indication 325 may indicate for the first UE 115 to apply the power adjustment for the downlink measurement to each of the downlink resource occasions 305 included in the quantity of most recent downlink resource occasions 330. In some other implementations, the adjustment indication 325 may include a mapping 335 that maps the power adjustment for the downlink measurement to one or more downlink resource occasions 305 of the quantity of most recent downlink resource occasions 330. For example, the adjustment indication 325 may include a bitmap that includes a bit B corresponding to each downlink resource occasion 305 included in the quantity of most recent downlink resource occasions 330 (for example, a bit B1 corresponding to the downlink resource occasion 305-b, a bit B2 corresponding to the downlink resource occasion 305-c, a bit B3 corresponding to the downlink resource occasion 305-d, and a bit B4 corresponding to the downlink resource occasion 305-e). Each bit B may indicate whether the first UE 115 is to apply the power adjustment for the downlink measurement to the corresponding downlink resource occasion 305. For instance, the bit B3 may indicate for the first UE 115 to apply the power adjustment for the downlink measurement to the downlink resource occasion 305-d based on the base station 105 reducing the transmission power of the downlink message 315 transmitted over the downlink resource occasion 305-d. Here, the bits B1, B2, and B4 may indicate that the first UE 115 is not to apply the power adjustment for the downlink measurement to the corresponding downlink resource occasions 305.

Figure 4:
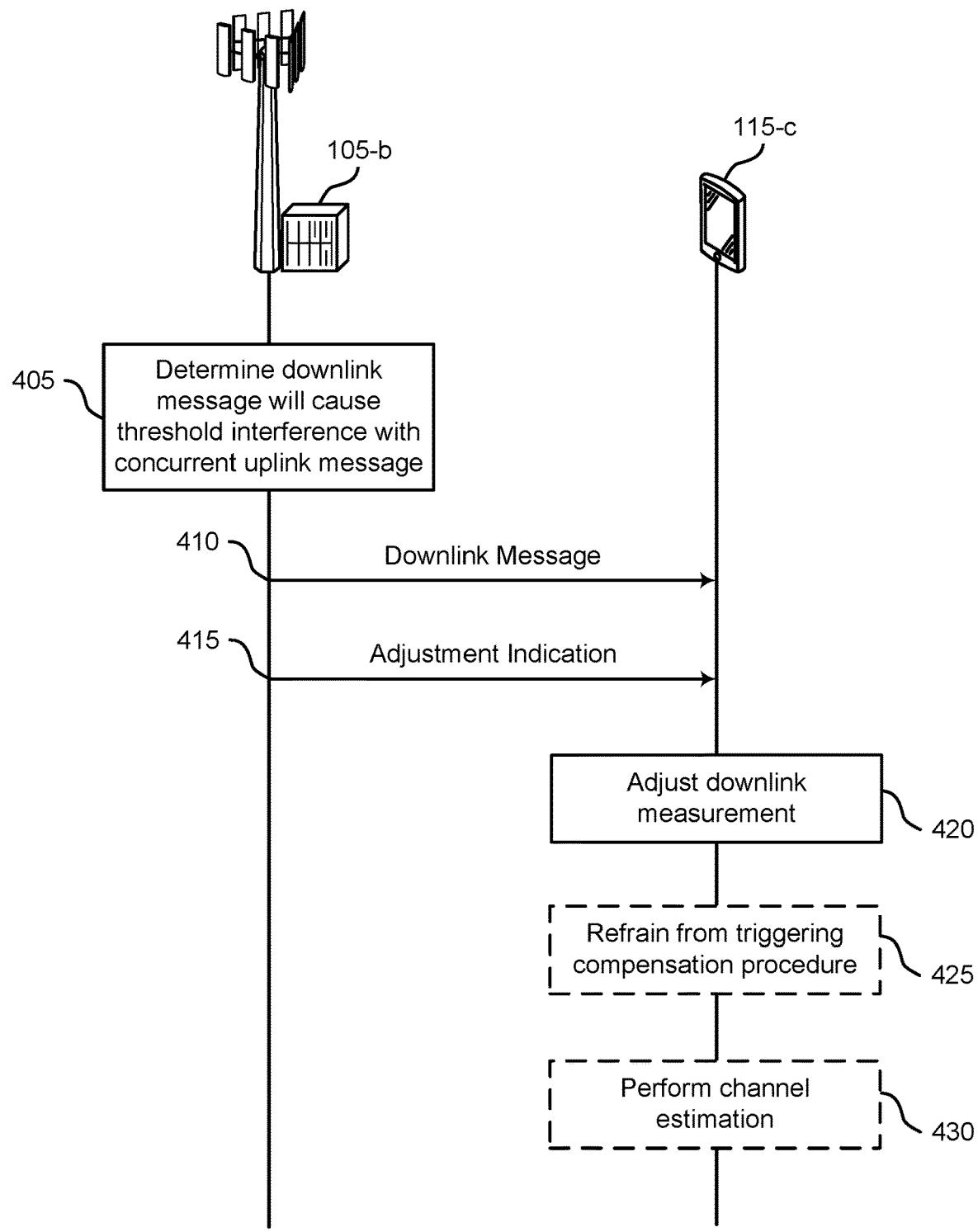
FIG. 4 illustrates an example of a process flow that supports procedures for indicating downlink power adjustments in accordance with aspects of the present disclosure.

FIG. 4 illustrates an example of a process flow 400 that supports procedures for indicating downlink power adjustments in accordance with aspects of the present disclosure. In some examples, the process flow 400 may be implemented by aspects of the wireless communications systems 100 and 200 as described with reference to FIGS. 1 and 2. For example, the process flow 400 may be implemented by a base station 105-b and a UE 115-c to support dynamic downlink power adjustments for full-duplex communications. The process flow 400 may further be implemented by the base station 105-b and the UE 115-c to provide improvements to reliability, data rates, spectral efficiency, latency, power consumption, resource utilization, coordination between devices, processing, and battery life, among other benefits.

The base station 105-b and the UE 115-c may be examples of a base station 105 and a UE 115 described with reference to FIGS. 1 and 2. In the following description of the process flow 400, the operations between the base station 105-b and the UE 115-c may be communicated in a different order than the example order shown, or the operations performed by the base station 105-b and the UE 115-c may be performed in different orders or at different times. Some operations may also be omitted from the process flow 400, and other operations may be added to the process flow 400.

At 405, the base station 105-b may determine that a scheduled downlink message will cause at least a threshold level of interference with an uplink message scheduled to be received at the base station 105-b concurrently with transmitting the scheduled downlink message. For example, the base station 105-b may detect that self-interference at the base station 105-b resulting from the concurrent (for example, simultaneous) communication of the scheduled downlink message and the scheduled uplink message may meet or exceed the threshold level of interference. In some examples, the scheduled uplink message may be an URLLC uplink message At 410, the base station 105-b may transmit the scheduled downlink message to the UE 115-c at a reduced transmission power relative to a first transmission power (for example, an expected transmission power) associated with the scheduled downlink message. For example, the first transmission power (for example, an expected transmission power) may correspond to a configured transmission power, such as an expected transmission power, of the scheduled downlink message. In response to determining that the scheduled downlink message will cause at least the threshold level of interference, the base station 105-b may decrease the transmission power of the scheduled downlink message from the first transmission power (for example, an expected transmission power) to the reduced transmission power, for example, in order to reduce the self-interference and increase a reliability of the uplink message.

At 415, the base station 105-b may transmit an adjustment indication to the UE 115-c that indicates a power adjustment for a downlink measurement associated with the scheduled downlink message. For example, the adjustment indication may indicate how to adjust the downlink measurement (for example, an RSRP measurement of one or more reference signals within the scheduled downlink message, a reference-signal-EPRE-to-PDSCH-EPRE ratio associated with the scheduled downlink message) to compensate for the reduction in transmission power of the scheduled downlink message. The adjustment indication may additionally indicate over which previous and most recent resource occasions, the UE 115-c is to apply the power adjustment for the downlink measurement.

At 420, the UE 115-c may adjust the downlink measurement in accordance with the adjustment indication. For example, the UE 115-c may adjust the RSRP measurement of the one or more reference signals or adjust the reference-signal-EPRE-to-PDSCH-EPRE ratio over the indicated resource occasions in accordance with the adjustment indication.

At 425, the UE 115-c may refrain from triggering a compensation procedure associated with receiving the scheduled downlink message at the reduced transmission power based on adjusting the downlink measurement. For example, the UE 115-c may refrain from triggering and performing a beam failure detection procedure, a beam failure recovery procedure, or a radio link management procedure, or may refrain from boosting an uplink power of one or more uplink messages transmitted in response to receiving the scheduled downlink message based on compensating for the reduced transmission power by adjusting the downlink measurement.

At 430, the UE 115-c may perform channel estimation associated with the scheduled downlink message based on adjusting the downlink measurement. For example, the UE 115-c may perform channel estimation using a reference-signal-EPRE-to-PDSCH-EPRE ratio indicated via the adjustment indication, which may compensate for the reduced transmission power and enable proper channel estimation associated with the scheduled downlink message.

Figure 5:
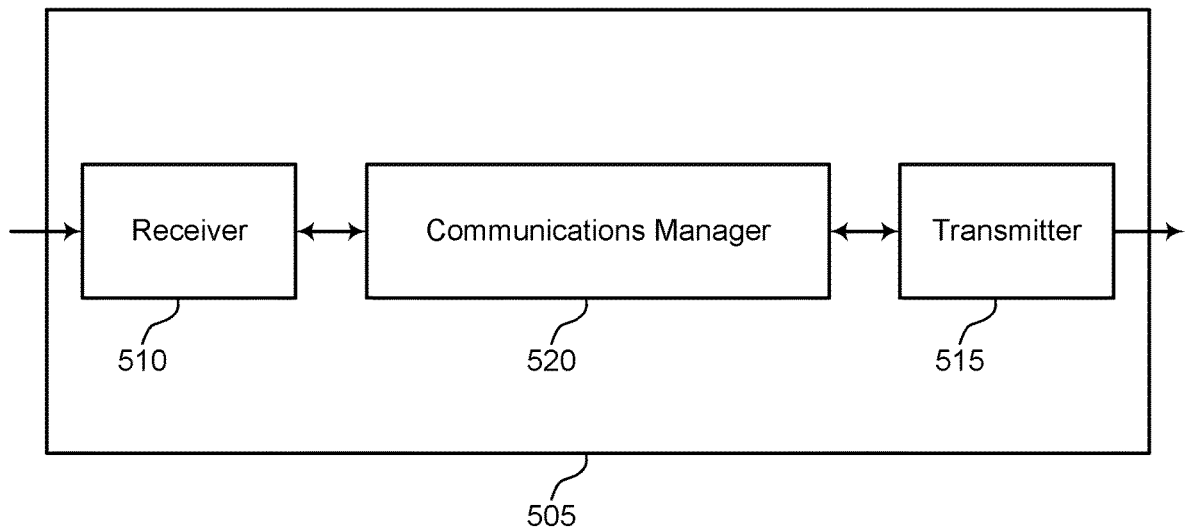
FIGS. 5 and 6 show block diagrams of devices that support procedures for indicating downlink power adjustments in accordance with aspects of the present disclosure.

FIG. 5 shows a block diagram of a device 505 that supports procedures for indicating downlink power adjustments in accordance with aspects of the present disclosure. The device 505 may be an example of aspects of a UE 115 as described herein. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to procedures for indicating downlink power adjustments). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to procedures for indicating downlink power adjustments). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of procedures for indicating downlink power adjustments as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 520, the receiver 510, the transmitter 515, or various combinations or components thereof may be implemented in code (for example, as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 520 may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a downlink message having a reduced transmission power relative to a first transmission power (for example, an expected transmission power) associated with the downlink message. The communications manager 520 may be configured as or otherwise support a means for receiving, from the base station and after receiving the downlink message, an indication of a power adjustment for a downlink measurement associated with the downlink message based on the downlink message having the reduced transmission power. The communications manager 520 may be configured as or otherwise support a means for adjusting the downlink measurement in accordance with the indication of the power adjustment for the downlink measurement.

By including or configuring the communications manager 520 in accordance with examples as described herein, the device 505 (for example, a processor controlling or otherwise coupled to the receiver 510, the transmitter 515, the communications manager 520, or a combination thereof) may support techniques for reduced processing, reduced power consumption, and more efficient utilization of communication resources, for example, by reducing (for example, preventing) the unnecessary triggering of compensation procedures associated with downlink messages transmitted at reduced transmission powers in order to increase uplink transmission reliability.

Figure 6:
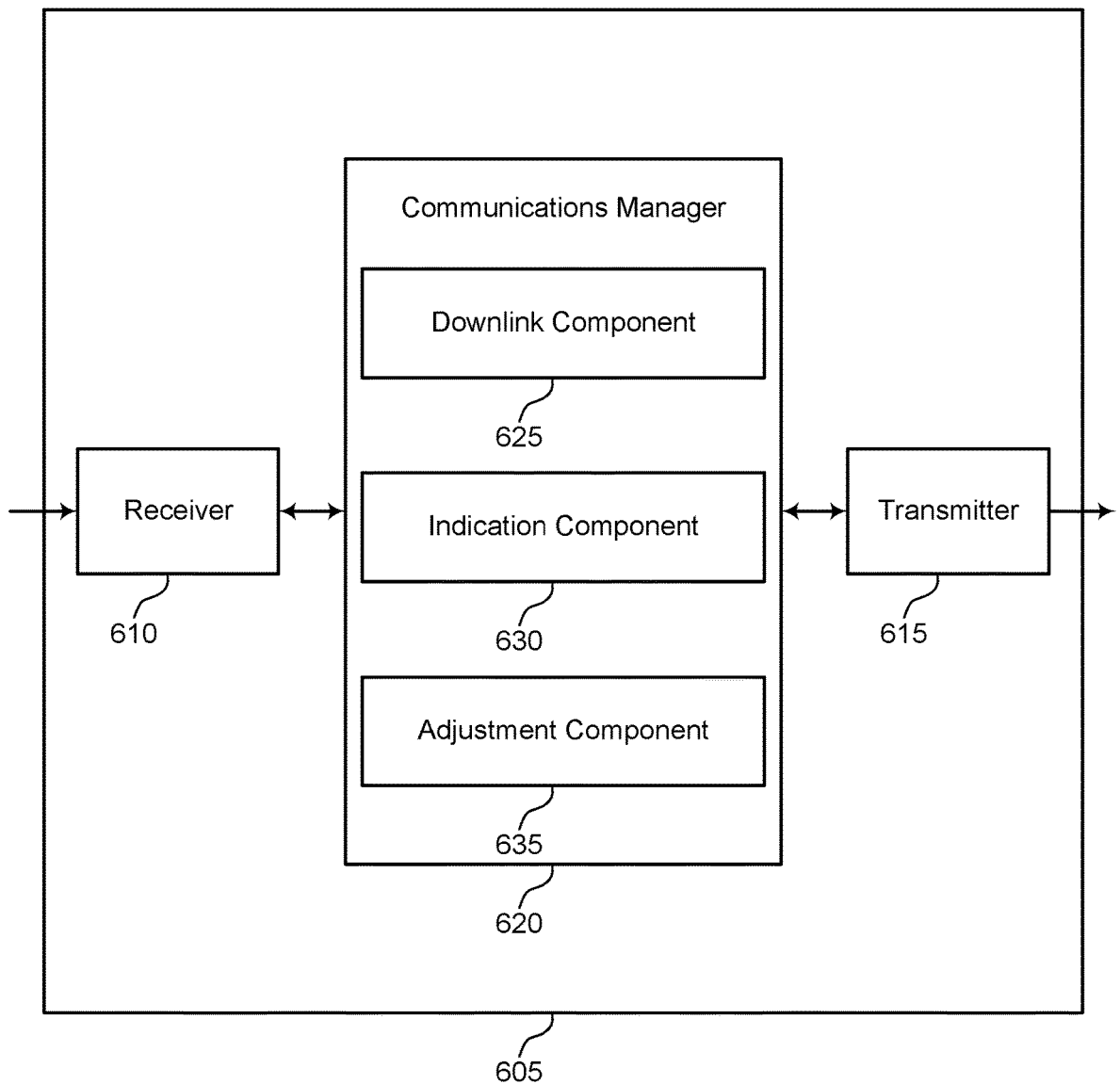

FIG. 6 shows a block diagram of a device 605 that supports procedures for indicating downlink power adjustments in accordance with aspects of the present disclosure. The device 605 may be an example of aspects of a device 505 or a UE 115 as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to procedures for indicating downlink power adjustments). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to procedures for indicating downlink power adjustments). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of procedures for indicating downlink power adjustments as described herein. For example, the communications manager 620 may include a downlink component 625, an indication component 630, an adjustment component 635, or any combination thereof. In some examples, the communications manager 620, or various components thereof, may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The downlink component 625 may be configured as or otherwise support a means for receiving, from a base station, a downlink message having a reduced transmission power relative to a first transmission power (for example, an expected transmission power) associated with the downlink message. The indication component 630 may be configured as or otherwise support a means for receiving, from the base station and after receiving the downlink message, an indication of a power adjustment for a downlink measurement associated with the downlink message based on the downlink message having the reduced transmission power. The adjustment component 635 may be configured as or otherwise support a means for adjusting the downlink measurement in accordance with the indication of the power adjustment for the downlink measurement.

Figure 7:
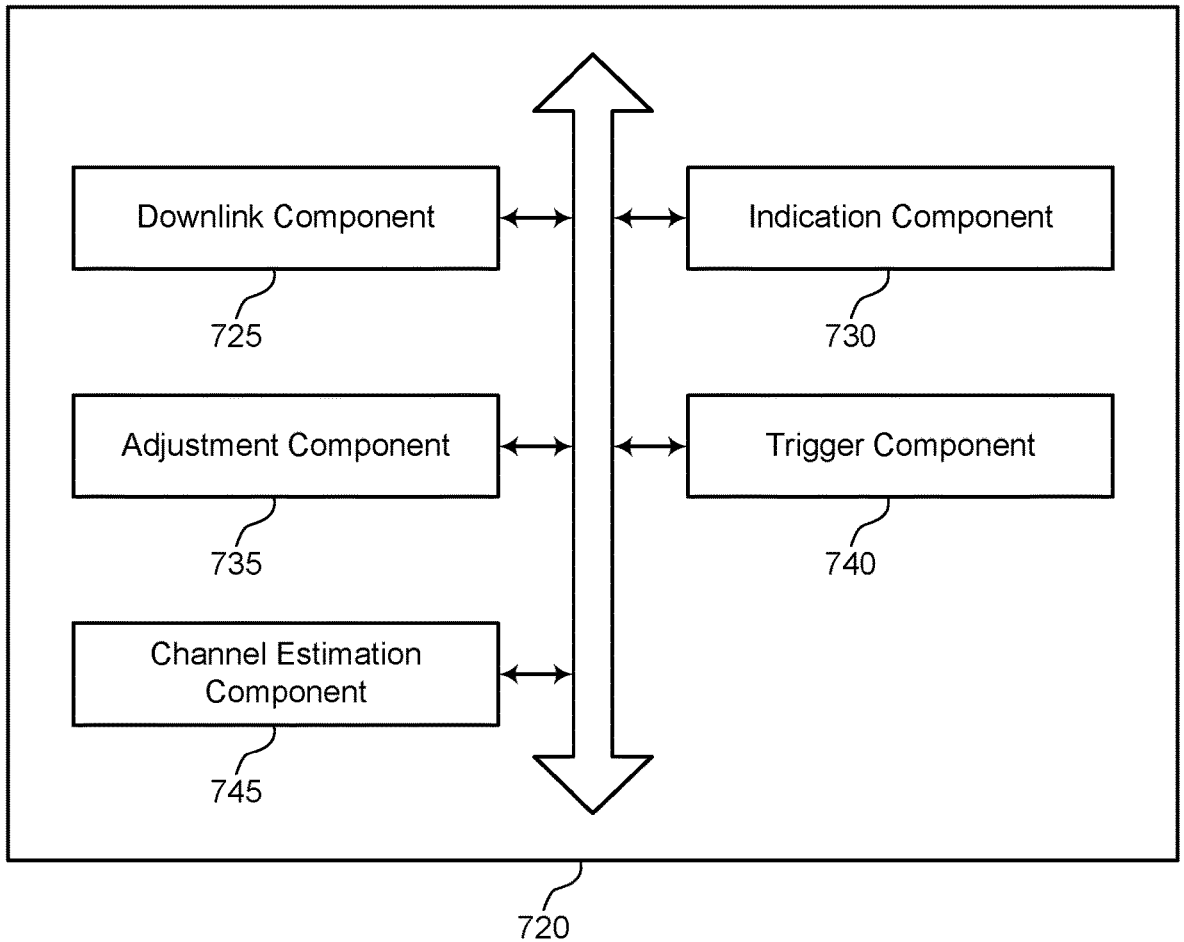
FIG. 7 shows a block diagram of a communications manager that supports procedures for indicating downlink power adjustments in accordance with aspects of the present disclosure.

FIG. 7 shows a block diagram of a communications manager 720 that supports procedures for indicating downlink power adjustments in accordance with aspects of the present disclosure. The communications manager 720, or various components thereof, may be an example of means for performing various aspects of procedures for indicating downlink power adjustments as described herein. For example, the communications manager 720 may include a downlink component 725, an indication component 730, an adjustment component 735, a trigger component 740, a channel estimation component 745, or any combination thereof. Each of these components may communicate, directly or indirectly, with one another (for example, via one or more buses).

The communications manager 720 may support wireless communication at a UE in accordance with examples as disclosed herein. The downlink component 725 may be configured as or otherwise support a means for receiving, from a base station, a downlink message having a reduced transmission power relative to a first transmission power (for example, an expected transmission power) associated with the downlink message. The indication component 730 may be configured as or otherwise support a means for receiving, from the base station and after receiving the downlink message, an indication of a power adjustment for a downlink measurement associated with the downlink message based on the downlink message having the reduced transmission power. The adjustment component 735 may be configured as or otherwise support a means for adjusting the downlink measurement in accordance with the indication of the power adjustment for the downlink measurement.

In some examples, the indication of the power adjustment for the downlink measurement indicates a value of a transmission power reduction from the first transmission power (for example, an expected transmission power) to the reduced transmission power. In some examples, to support adjusting the downlink measurement, the adjustment component 735 may be configured as or otherwise support a means for increasing an RSRP measurement of one or more reference signals within the downlink message by the value of the transmission power reduction.

In some examples, to support adjusting the downlink measurement, the adjustment component 735 may be configured as or otherwise support a means for increasing an RSRP measurement of one or more reference signals within the downlink message by a value indicated by the indication of the power adjustment for the downlink measurement, a magnitude of the value corresponding to a magnitude of a value of a transmission power reduction from the first transmission power (for example, an expected transmission power) to the reduced transmission power.

In some examples, the indication of the power adjustment for the downlink measurement indicates an application of the power adjustment for the downlink measurement to reference signals received over a quantity of most recent resources prior to reception of the indication of the power adjustment for the downlink measurement. In some examples, the downlink message is received over one or more resources of the quantity of most recent resources.

In some examples, the indication of the power adjustment for the downlink measurement indicates a mapping that maps the power adjustment for the downlink measurement to one or more resources of a quantity of most recent resources prior to reception of the indication of the power adjustment for the downlink measurement.

In some examples, the indication of the power adjustment for the downlink measurement indicates a transmission power reduction from the first transmission power (for example, an expected transmission power) by a value less than a threshold power, the threshold power associated with a cancellation of the downlink message.

In some examples, the indication of the power adjustment for the downlink measurement indicates a transmission power reduction from the first transmission power (for example, an expected transmission power) by at least a threshold power, the indication of the power adjustment for the downlink measurement indicating a cancellation of the downlink message based on the first transmission power (for example, an expected transmission power) being reduced by at least the threshold power.

In some examples, the trigger component 740 may be configured as or otherwise support a means for refraining from triggering a compensation procedure associated with receiving the downlink message at the reduced transmission power based on adjusting the downlink measurement.

In some examples, the channel estimation component 745 may be configured as or otherwise support a means for performing channel estimation associated with the downlink message based on adjusting the downlink measurement.

In some examples, the indication of the power adjustment for the downlink measurement indicates a first reference signal EPRE to PDSCH EPRE ratio for use in the channel estimation that is different than a second reference signal EPRE to PDSCH EPRE ratio associated with the downlink message.

In some examples, the indication of the power adjustment for the downlink measurement indicates the first reference signal EPRE to PDSCH EPRE ratio from a table of reference signal EPRE to PDSCH EPRE ratios including the first reference signal EPRE to PDSCH EPRE ratio and the second reference signal EPRE to PDSCH EPRE ratio.

In some examples, the indication of the power adjustment for the downlink measurement indicates an offset of a reference signal EPRE to PDSCH EPRE ratio associated with the downlink message. In some examples, performing the channel estimation is based on applying the offset to the reference EPRE to PDSCH EPRE ratio.

In some examples, the indication of the power adjustment for the downlink measurement indicates an adjustment to a reference signal EPRE value of a reference signal EPRE to PDSCH EPRE ratio associated with the downlink message. In some examples, performing the channel estimation is based on adjusting the reference signal EPRE value.

In some examples, the indication of the power adjustment for the downlink measurement indicates an adjustment to a PDSCH EPRE value of a reference signal EPRE to PDSCH EPRE ratio associated with the downlink message. In some examples, performing the channel estimation is based on adjusting the PDSCH EPRE value.

Figure 8:
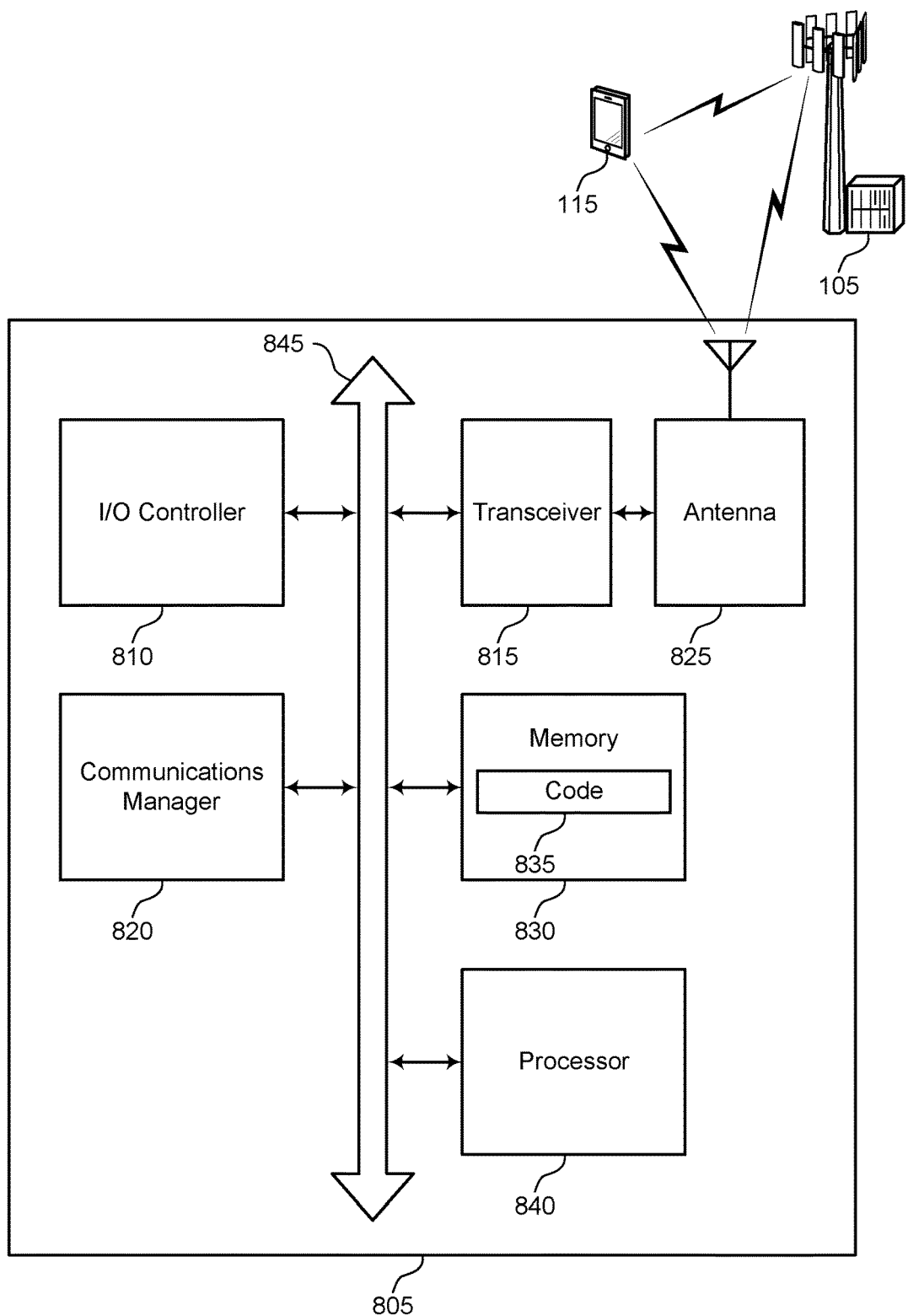
FIG. 8 shows a diagram of a system including a device that supports procedures for indicating downlink power adjustments in accordance with aspects of the present disclosure.

FIG. 8 shows a diagram of a system including a device 805 that supports procedures for indicating downlink power adjustments in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some examples, the I/O controller 810 may represent a physical connection or port to an external peripheral. In some examples, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some examples, the I/O controller 810 may be implemented as part of a processor, such as the processor 840. In some examples, a user may interact with the device 805 via the I/O controller 810 or via hardware components controlled by the I/O controller 810.

In some examples, the device 805 may include a single antenna 825. However, in some other examples, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some examples, the code 835 may not be directly executable by the processor 840 but may cause a computer (for example, when compiled and executed) to perform functions described herein. In some examples, the memory 830 may contain, among other things, a basic I/O system (BIOS) which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In some other examples, a memory controller may be integrated into the processor 840. The processor 840 may be configured to execute computer-readable instructions stored in a memory (for example, the memory 830) to cause the device 805 to perform various functions (for example, functions or tasks supporting procedures for indicating downlink power adjustments). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a downlink message having a reduced transmission power relative to a first transmission power (for example, an expected transmission power) associated with the downlink message. The communications manager 820 may be configured as or otherwise support a means for receiving, from the base station and after receiving the downlink message, an indication of a power adjustment for a downlink measurement associated with the downlink message based on the downlink message having the reduced transmission power. The communications manager 820 may be configured as or otherwise support a means for adjusting the downlink measurement in accordance with the indication of the power adjustment for the downlink measurement.

By including or configuring the communications manager 820 in accordance with examples as described herein, the device 805 may support techniques for improved reliability, data rates, spectral efficiency, latency, power consumption, resource utilization, coordination between devices, processing, and battery life, among other benefits.

In some examples, the communications manager 820 may be configured to perform various operations (for example, receiving, monitoring, transmitting) using or otherwise in cooperation with the transceiver 815, the one or more antennas 825, or any combination thereof Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of procedures for indicating downlink power adjustments as described herein, or the processor 840 and the memory 830 may be otherwise configured to perform or support such operations.

Figure 9:
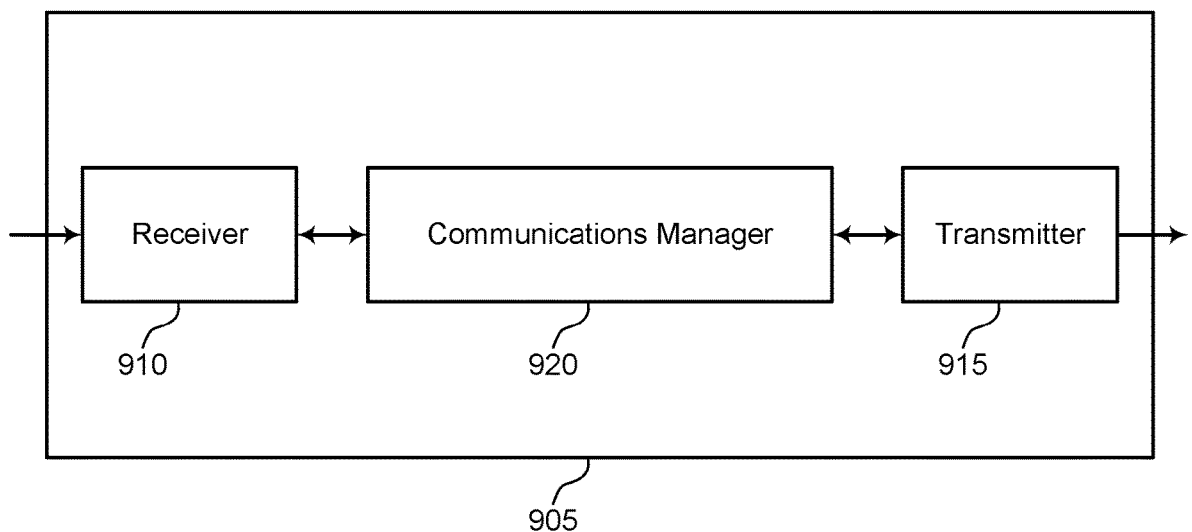
FIGS. 9 and 10 show block diagrams of devices that support procedures for indicating downlink power adjustments in accordance with aspects of the present disclosure.

FIG. 9 shows a block diagram of a device 905 that supports procedures for indicating downlink power adjustments in accordance with aspects of the present disclosure. The device 905 may be an example of aspects of a base station 105 as described herein. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to procedures for indicating downlink power adjustments). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to procedures for indicating downlink power adjustments). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of procedures for indicating downlink power adjustments as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 920, the receiver 910, the transmitter 915, or various combinations or components thereof may be implemented in code (for example, as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 920 may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for determining that a scheduled downlink message will cause at least a threshold level of interference with an uplink message scheduled to be received at the base station concurrently with transmitting the scheduled downlink message. The communications manager 920 may be configured as or otherwise support a means for transmitting, to a UE, the scheduled downlink message using a reduced transmission power relative to a first transmission power (for example, an expected transmission power) associated with the scheduled downlink message based on the determining. The communications manager 920 may be configured as or otherwise support a means for transmitting, to the UE after transmitting the scheduled downlink message, an indication of a power adjustment for a downlink measurement associated with the scheduled downlink message based on transmitting the scheduled downlink message using the reduced transmission power.

By including or configuring the communications manager 920 in accordance with examples as described herein, the device 905 (for example, a processor controlling or otherwise coupled to the receiver 910, the transmitter 915, the communications manager 920, or a combination thereof) may support techniques for reduced processing, reduced power consumption, and more efficient utilization of communication resources, for example, by reducing (for example, preventing) the unnecessary triggering of compensation procedures associated with downlink messages transmitted at reduced transmission powers in order to increase uplink transmission reliability.

Figure 10:
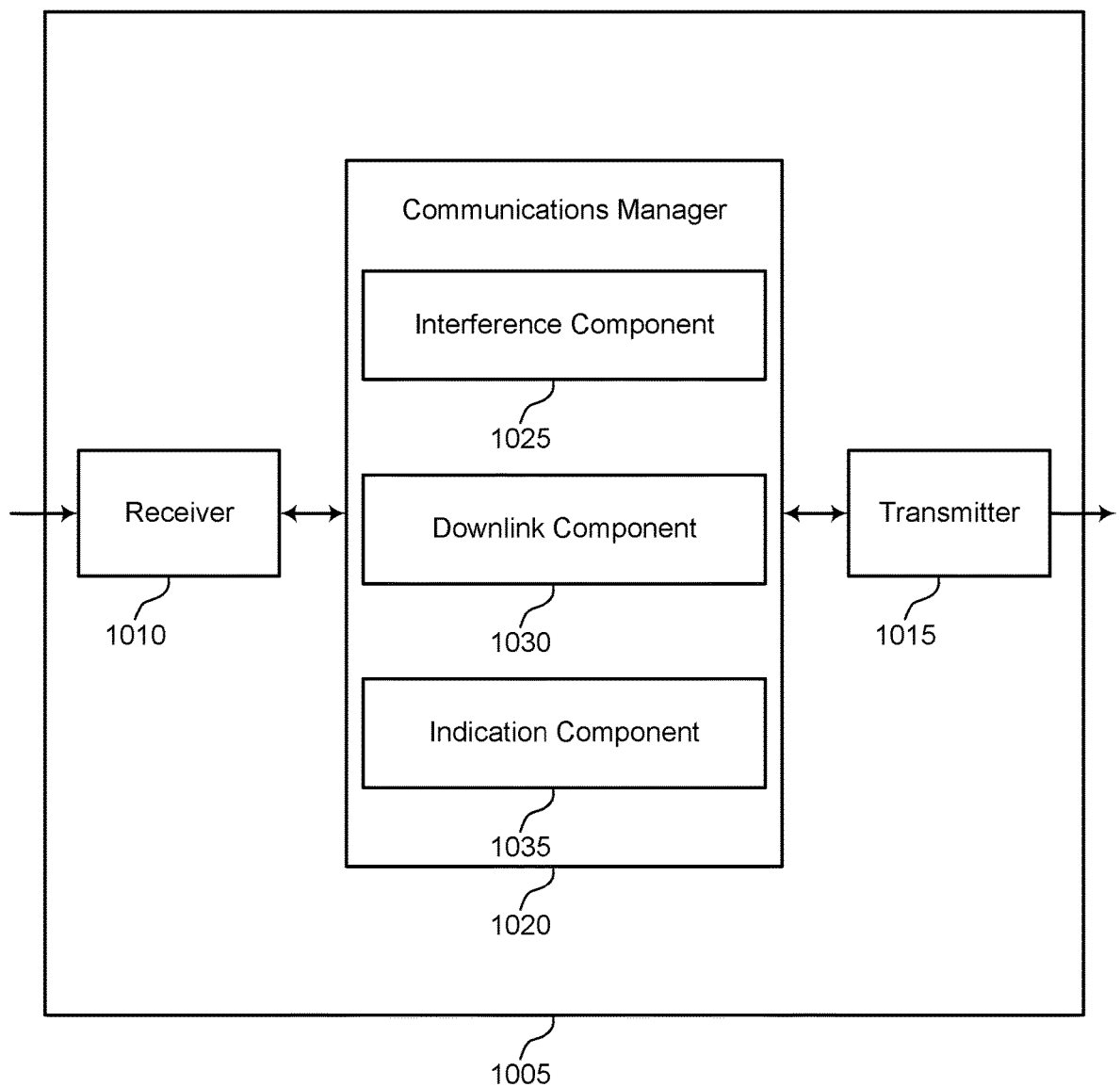

FIG. 10 shows a block diagram of a device 1005 that supports procedures for indicating downlink power adjustments in accordance with aspects of the present disclosure. The device 1005 may be an example of aspects of a device 905 or a base station 105 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to procedures for indicating downlink power adjustments). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to procedures for indicating downlink power adjustments). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of procedures for indicating downlink power adjustments as described herein. For example, the communications manager 1020 may include an interference component 1025, a downlink component 1030, an indication component 1035, or any combination thereof. In some examples, the communications manager 1020, or various components thereof, may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The interference component 1025 may be configured as or otherwise support a means for determining that a scheduled downlink message will cause at least a threshold level of interference with an uplink message scheduled to be received at the base station concurrently with transmitting the scheduled downlink message. The downlink component 1030 may be configured as or otherwise support a means for transmitting, to a UE, the scheduled downlink message using a reduced transmission power relative to a first transmission power (for example, an expected transmission power) associated with the scheduled downlink message based on the determining. The indication component 1035 may be configured as or otherwise support a means for transmitting, to the UE after transmitting the scheduled downlink message, an indication of a power adjustment for a downlink measurement associated with the scheduled downlink message based on transmitting the scheduled downlink message using the reduced transmission power.

Figure 11:
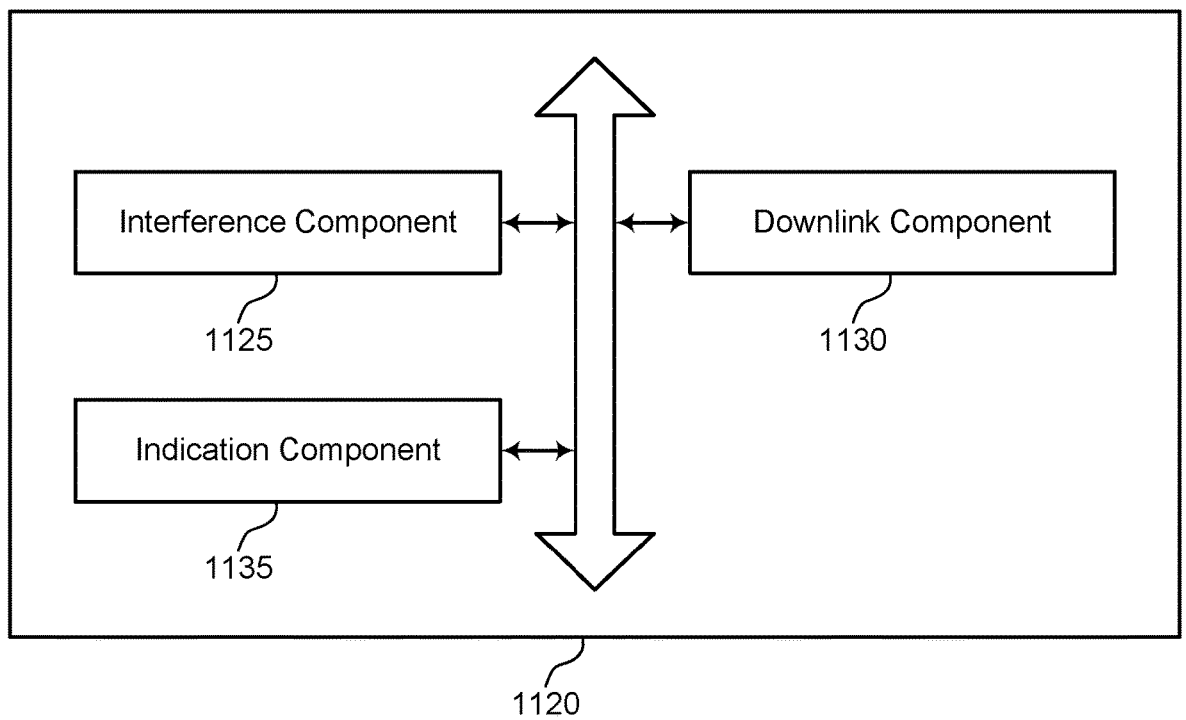
FIG. 11 shows a block diagram of a communications manager that supports procedures for indicating downlink power adjustments in accordance with aspects of the present disclosure.

FIG. 11 shows a block diagram of a communications manager 1120 that supports procedures for indicating downlink power adjustments in accordance with aspects of the present disclosure. The communications manager 1120, or various components thereof, may be an example of means for performing various aspects of procedures for indicating downlink power adjustments as described herein. For example, the communications manager 1120 may include an interference component 1125, a downlink component 1130, an indication component 1135, or any combination thereof. Each of these components may communicate, directly or indirectly, with one another (for example, via one or more buses).

The communications manager 1120 may support wireless communication at a base station in accordance with examples as disclosed herein. The interference component 1125 may be configured as or otherwise support a means for determining that a scheduled downlink message will cause at least a threshold level of interference with an uplink message scheduled to be received at the base station concurrently with transmitting the scheduled downlink message. The downlink component 1130 may be configured as or otherwise support a means for transmitting, to a UE, the scheduled downlink message using a reduced transmission power relative to a first transmission power (for example, an expected transmission power) associated with the scheduled downlink message based on the determining. The indication component 1135 may be configured as or otherwise support a means for transmitting, to the UE after transmitting the scheduled downlink message, an indication of a power adjustment for a downlink measurement associated with the scheduled downlink message based on transmitting the scheduled downlink message using the reduced transmission power.

In some examples, the indication of the power adjustment for the downlink measurement indicates a value of a transmission power reduction from the first transmission power (for example, an expected transmission power) to the reduced transmission power, the power adjustment for the downlink measurement corresponding to an increase of an RSRP measurement of one or more reference signals within the scheduled downlink message by the value of the transmission power reduction.

In some examples, the indication of the power adjustment for the downlink measurement indicates a value by which the UE is to increase an RSRP measurement of one or more reference signals within the scheduled downlink message, a magnitude of the value corresponding to a magnitude of a value of a transmission power reduction from the first transmission power (for example, an expected transmission power) to the reduced transmission power.

In some examples, the indication of the power adjustment for the downlink measurement indicates an application of the power adjustment for the downlink measurement to reference signals transmitted over a quantity of most recent resource occasions prior to transmission of the indication of the power adjustment for the downlink measurement.

In some examples, the indication of the power adjustment for the downlink measurement indicates a mapping that maps the power adjustment for the downlink measurement to one or more resource occasions of a quantity of most recent resource occasions prior to transmission of the indication of the power adjustment for the downlink measurement.

In some examples, the indication of the power adjustment for the downlink measurement indicates a transmission power reduction from the first transmission power (for example, an expected transmission power) by a value less than a threshold power, the threshold power associated with a cancellation of the scheduled downlink message.

In some examples, the indication of the power adjustment for the downlink measurement indicates a transmission power reduction from the first transmission power (for example, an expected transmission power) by at least a threshold power, the indication of the power adjustment for the downlink measurement indicating a cancellation of the scheduled downlink message based on the first transmission power (for example, an expected transmission power) being reduced by at least the threshold power.

In some examples, the indication of the power adjustment for the downlink measurement indicates a first reference signal EPRE to PDSCH EPRE ratio for the UE to use in channel estimation associated with the scheduled downlink message that is different than a second reference signal EPRE to PDSCH EPRE ratio associated with the scheduled downlink message.

In some examples, the indication of the power adjustment for the downlink measurement indicates the first reference signal EPRE to PDSCH EPRE ratio from a table of reference signal EPRE to PDSCH EPRE ratios including the first reference signal EPRE to PDSCH EPRE ratio and the second reference signal EPRE to PDSCH EPRE ratio.

In some examples, the indication of the power adjustment for the downlink measurement indicates an offset of a reference signal EPRE to PDSCH EPRE ratio associated with the scheduled downlink message.

In some examples, the indication of the power adjustment for the downlink measurement indicates an adjustment to a reference signal EPRE value of a reference signal EPRE to PDSCH EPRE ratio associated with the scheduled downlink message.

In some examples, the indication of the power adjustment for the downlink measurement indicates an adjustment to a PDSCH EPRE value of a reference signal EPRE to PDSCH EPRE ratio associated with the scheduled downlink message.

In some examples, the indication of the power adjustment for the downlink measurement is transmitted in DCI or a MAC-CE.

Figure 12:
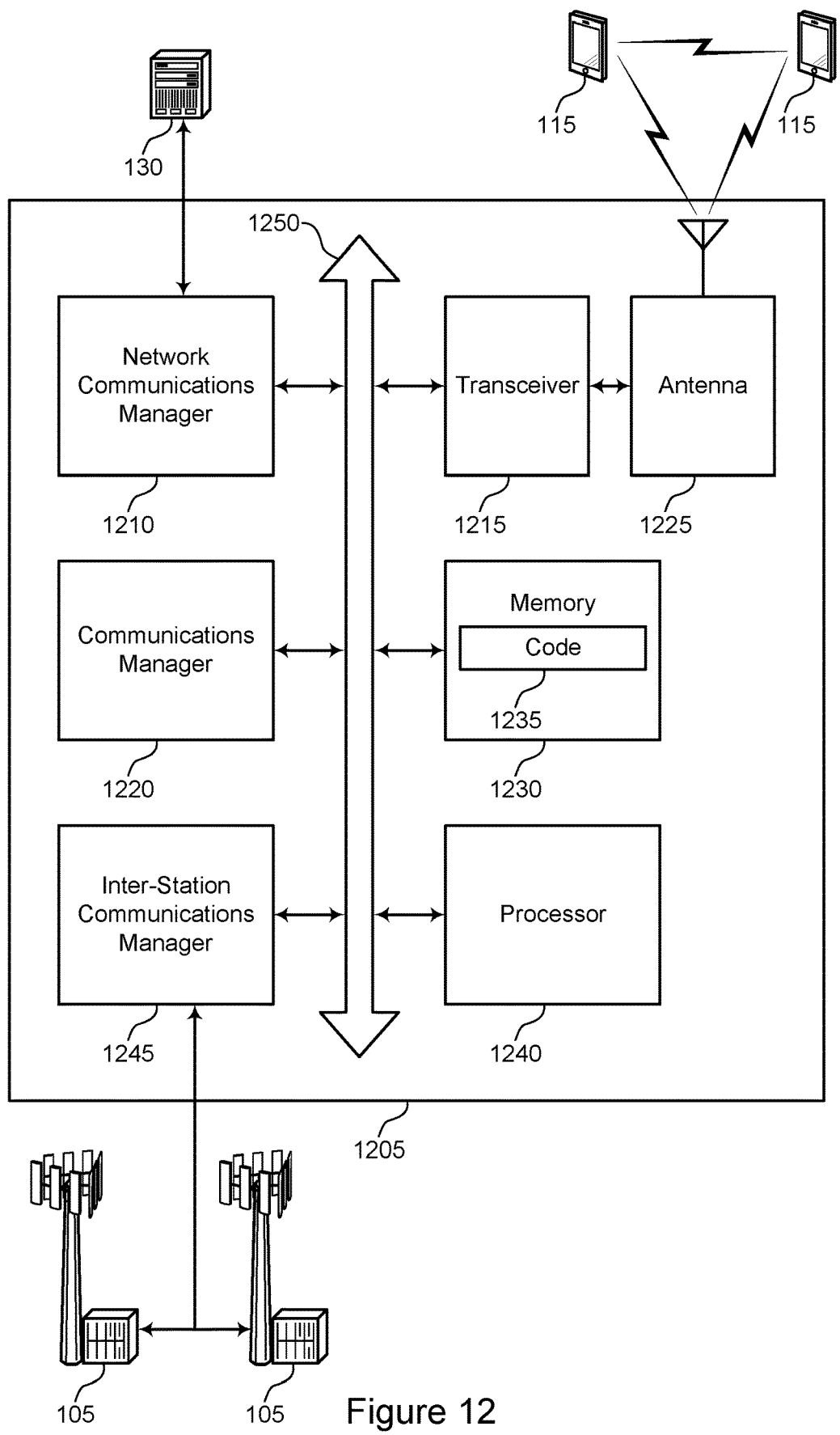
FIG. 12 shows a diagram of a system including a device that supports procedures for indicating downlink power adjustments in accordance with aspects of the present disclosure.

FIG. 12 shows a diagram of a system including a device 1205 that supports procedures for indicating downlink power adjustments in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (for example, operatively, communicatively, functionally, electronically, electrically) via one or more buses (for example, a bus 1250).

The network communications manager 1210 may manage communications with a core network 130 (for example, via one or more wired backhaul links). For example, the network communications manager 1210 may manage the transfer of data communications for client devices, such as one or more UEs 115.

In some examples, the device 1205 may include a single antenna 1225. However, in some other examples the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some examples, the code 1235 may not be directly executable by the processor 1240 but may cause a computer (for example, when compiled and executed) to perform functions described herein. In some examples, the memory 1230 may contain, among other things, a BIOS which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some other examples, a memory controller may be integrated into the processor 1240. The processor 1240 may be configured to execute computer-readable instructions stored in a memory (for example, the memory 1230) to cause the device 1205 to perform various functions (for example, functions or tasks supporting procedures for indicating downlink power adjustments). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for determining that a scheduled downlink message will cause at least a threshold level of interference with an uplink message scheduled to be received at the base station concurrently with transmitting the scheduled downlink message. The communications manager 1220 may be configured as or otherwise support a means for transmitting, to a UE, the scheduled downlink message using a reduced transmission power relative to a first transmission power (for example, an expected transmission power) associated with the scheduled downlink message based on the determining. The communications manager 1220 may be configured as or otherwise support a means for transmitting, to the UE after transmitting the scheduled downlink message, an indication of a power adjustment for a downlink measurement associated with the scheduled downlink message based on transmitting the scheduled downlink message using the reduced transmission power.

By including or configuring the communications manager 1220 in accordance with examples as described herein, the device 1205 may support techniques for improved reliability, data rates, spectral efficiency, latency, power consumption, resource utilization, coordination between devices, and processing, among other benefits.

In some examples, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of procedures for indicating downlink power adjustments as described herein, or the processor 1240 and the memory 1230 may be otherwise configured to perform or support such operations.

Figure 13:
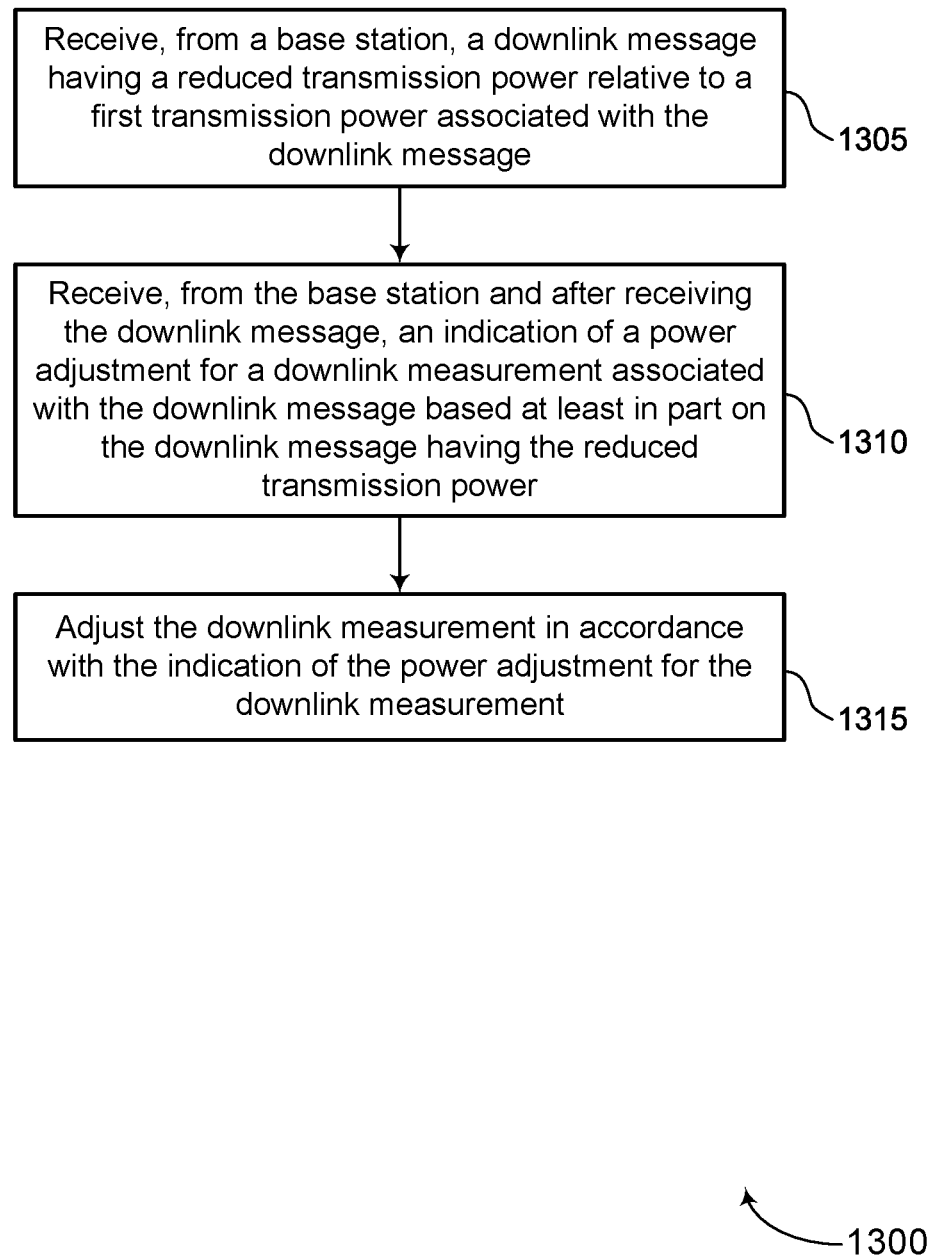
FIGS. 13 through 17 show flowcharts illustrating methods that support procedures for indicating downlink power adjustments in accordance with aspects of the present disclosure.

FIG. 13 shows a flowchart illustrating a method 1300 that supports procedures for indicating downlink power adjustments in accordance with aspects of the present disclosure. The operations of the method 1300 may be implemented by a UE or its components as described herein. For example, the operations of the method 1300 may be performed by a UE 115 as described with reference to FIGS. 1-8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a downlink message having a reduced transmission power relative to a first transmission power (for example, an expected transmission power) associated with the downlink message. The operations of 1305 may be performed in accordance with examples as disclosed herein. In some examples, aspects of the operations of 1305 may be performed by a downlink component 725 as described with reference to FIG. 7.

At 1310, the method may include receiving, from the base station and after receiving the downlink message, an indication of a power adjustment for a downlink measurement associated with the downlink message based on the downlink message having the reduced transmission power. The operations of 1310 may be performed in accordance with examples as disclosed herein. In some examples, aspects of the operations of 1310 may be performed by an indication component 730 as described with reference to FIG. 7.

At 1315, the method may include adjusting the downlink measurement in accordance with the indication of the power adjustment for the downlink measurement. The operations of 1315 may be performed in accordance with examples as disclosed herein. In some examples, aspects of the operations of 1315 may be performed by an adjustment component 735 as described with reference to FIG. 7.

Figure 14:
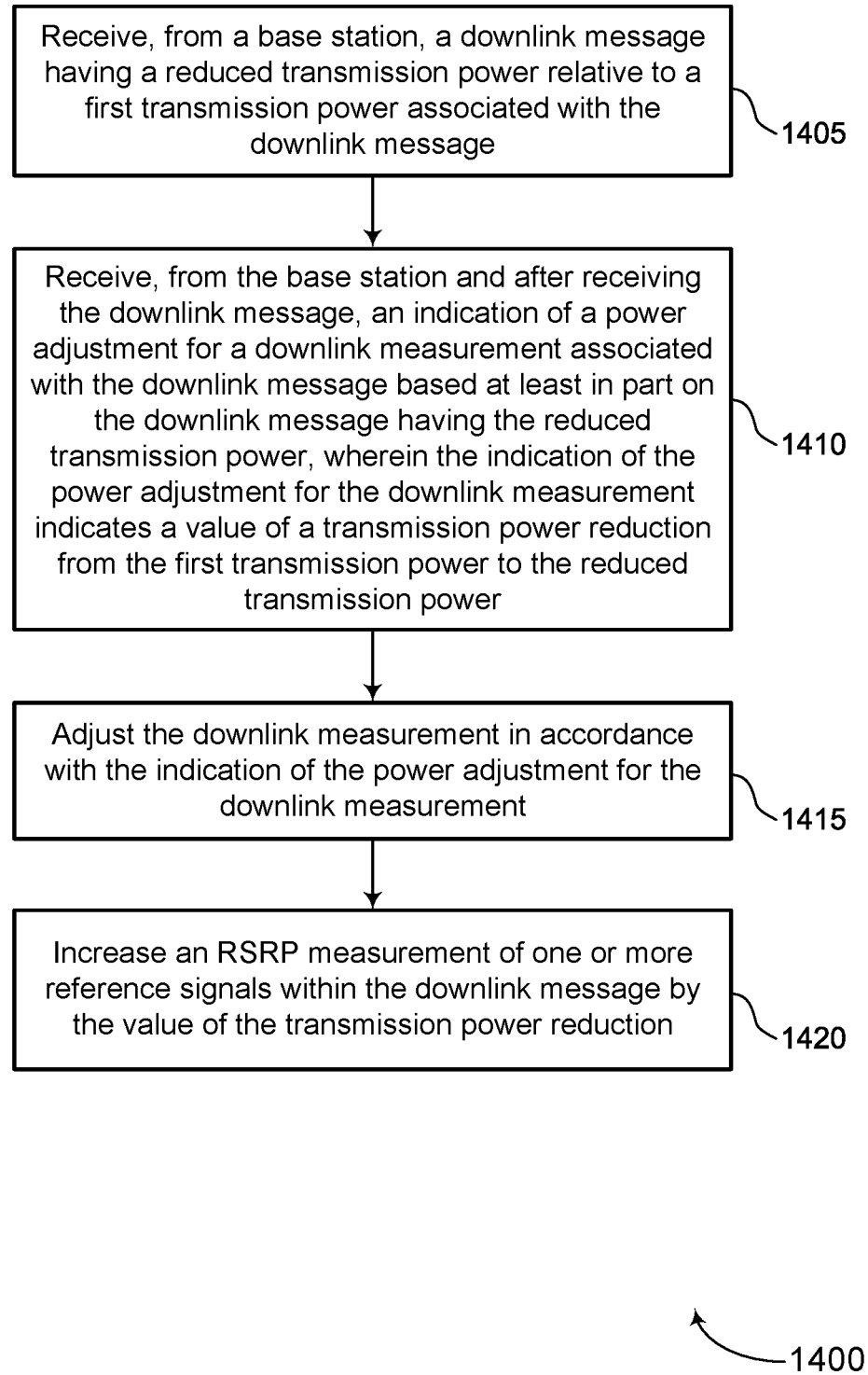

FIG. 14 shows a flowchart illustrating a method 1400 that supports procedures for indicating downlink power adjustments in accordance with aspects of the present disclosure. The operations of the method 1400 may be implemented by a UE or its components as described herein. For example, the operations of the method 1400 may be performed by a UE 115 as described with reference to FIGS. 1-8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a downlink message having a reduced transmission power relative to a first transmission power (for example, an expected transmission power) associated with the downlink message. The operations of 1405 may be performed in accordance with examples as disclosed herein. In some examples, aspects of the operations of 1405 may be performed by a downlink component 725 as described with reference to FIG. 7.

At 1410, the method may include receiving, from the base station and after receiving the downlink message, an indication of a power adjustment for a downlink measurement associated with the downlink message based on the downlink message having the reduced transmission power, where the indication of the power adjustment for the downlink measurement indicates a value of a transmission power reduction from the first transmission power (for example, an expected transmission power) to the reduced transmission power. The operations of 1410 may be performed in accordance with examples as disclosed herein. In some examples, aspects of the operations of 1410 may be performed by an indication component 730 as described with reference to FIG. 7.

At 1415, the method may include adjusting the downlink measurement in accordance with the indication of the power adjustment for the downlink measurement. The operations of 1415 may be performed in accordance with examples as disclosed herein. In some examples, aspects of the operations of 1415 may be performed by an adjustment component 735 as described with reference to FIG. 7.

At 1420, to adjust the downlink measurement, the method may include increasing an RSRP measurement of one or more reference signals within the downlink message by the value of the transmission power reduction. The operations of 1420 may be performed in accordance with examples as disclosed herein. In some examples, aspects of the operations of 1420 may be performed by an adjustment component 735 as described with reference to FIG. 7.

Figure 15:
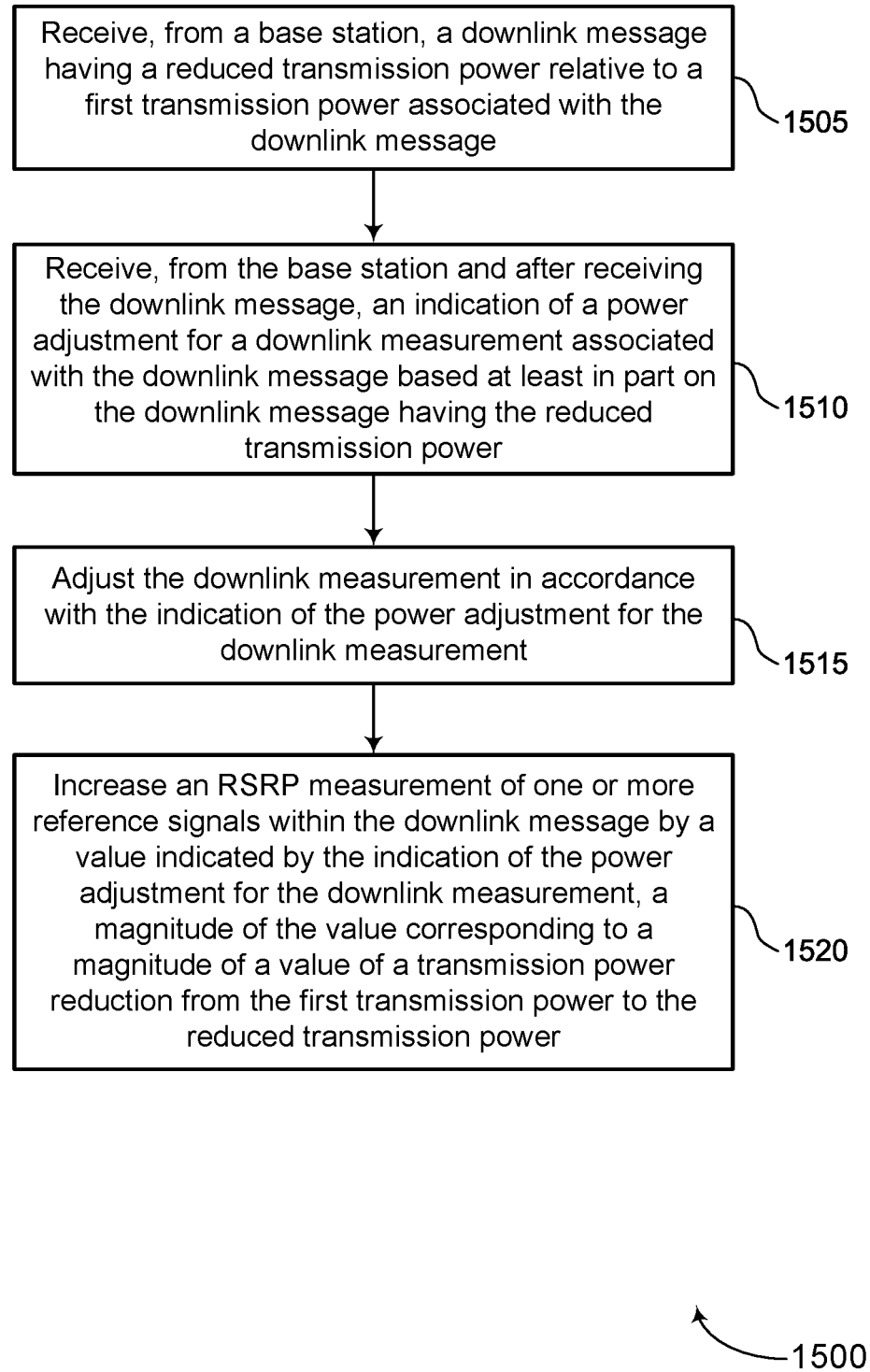

FIG. 15 shows a flowchart illustrating a method 1500 that supports procedures for indicating downlink power adjustments in accordance with aspects of the present disclosure. The operations of the method 1500 may be implemented by a UE or its components as described herein. For example, the operations of the method 1500 may be performed by a UE 115 as described with reference to FIGS. 1-8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a downlink message having a reduced transmission power relative to a first transmission power (for example, an expected transmission power) associated with the downlink message. The operations of 1505 may be performed in accordance with examples as disclosed herein. In some examples, aspects of the operations of 1505 may be performed by a downlink component 725 as described with reference to FIG. 7.

At 1510, the method may include receiving, from the base station and after receiving the downlink message, an indication of a power adjustment for a downlink measurement associated with the downlink message based on the downlink message having the reduced transmission power. The operations of 1510 may be performed in accordance with examples as disclosed herein. In some examples, aspects of the operations of 1510 may be performed by an indication component 730 as described with reference to FIG. 7.

At 1515, the method may include adjusting the downlink measurement in accordance with the indication of the power adjustment for the downlink measurement. The operations of 1515 may be performed in accordance with examples as disclosed herein. In some examples, aspects of the operations of 1515 may be performed by an adjustment component 735 as described with reference to FIG. 7.

At 1520, to adjust the downlink measurement, the method may include increasing an RSRP measurement of one or more reference signals within the downlink message by a value indicated by the indication of the power adjustment for the downlink measurement, a magnitude of the value corresponding to a magnitude of a value of a transmission power reduction from the first transmission power (for example, an expected transmission power) to the reduced transmission power. The operations of 1520 may be performed in accordance with examples as disclosed herein. In some examples, aspects of the operations of 1520 may be performed by an adjustment component 735 as described with reference to FIG. 7.

Figure 16:
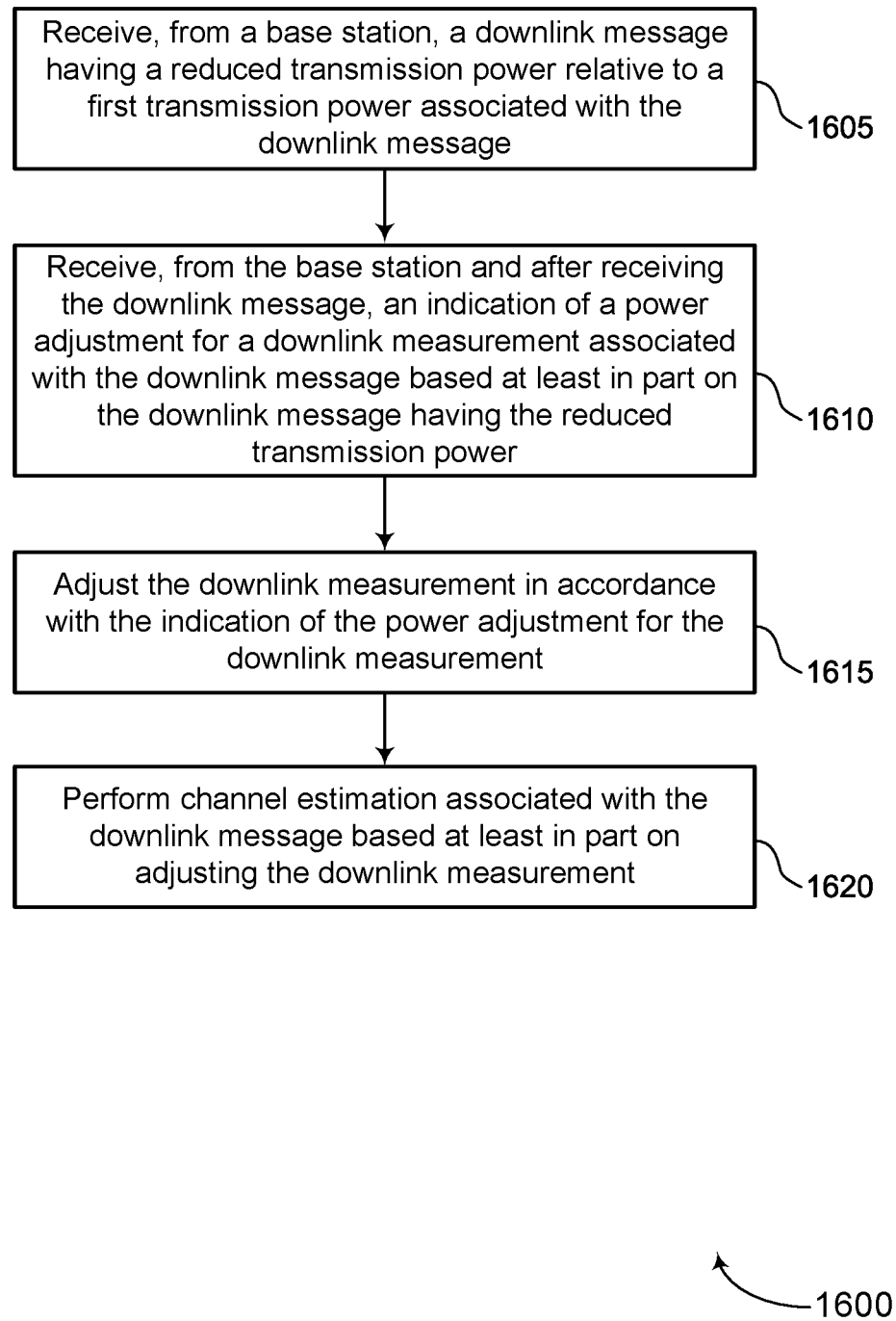

FIG. 16 shows a flowchart illustrating a method 1600 that supports procedures for indicating downlink power adjustments in accordance with aspects of the present disclosure. The operations of the method 1600 may be implemented by a UE or its components as described herein. For example, the operations of the method 1600 may be performed by a UE 115 as described with reference to FIGS. 1-8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a downlink message having a reduced transmission power relative to a first transmission power (for example, an expected transmission power) associated with the downlink message. The operations of 1605 may be performed in accordance with examples as disclosed herein. In some examples, aspects of the operations of 1605 may be performed by a downlink component 725 as described with reference to FIG. 7.

At 1610, the method may include receiving, from the base station and after receiving the downlink message, an indication of a power adjustment for a downlink measurement associated with the downlink message based on the downlink message having the reduced transmission power. The operations of 1610 may be performed in accordance with examples as disclosed herein. In some examples, aspects of the operations of 1610 may be performed by an indication component 730 as described with reference to FIG. 7.

At 1615, the method may include adjusting the downlink measurement in accordance with the indication of the power adjustment for the downlink measurement. The operations of 1615 may be performed in accordance with examples as disclosed herein. In some examples, aspects of the operations of 1615 may be performed by an adjustment component 735 as described with reference to FIG. 7.

At 1620, the method may include performing channel estimation associated with the downlink message based on adjusting the downlink measurement. The operations of 1620 may be performed in accordance with examples as disclosed herein. In some examples, aspects of the operations of 1620 may be performed by a channel estimation component 745 as described with reference to FIG. 7.

Figure 17:
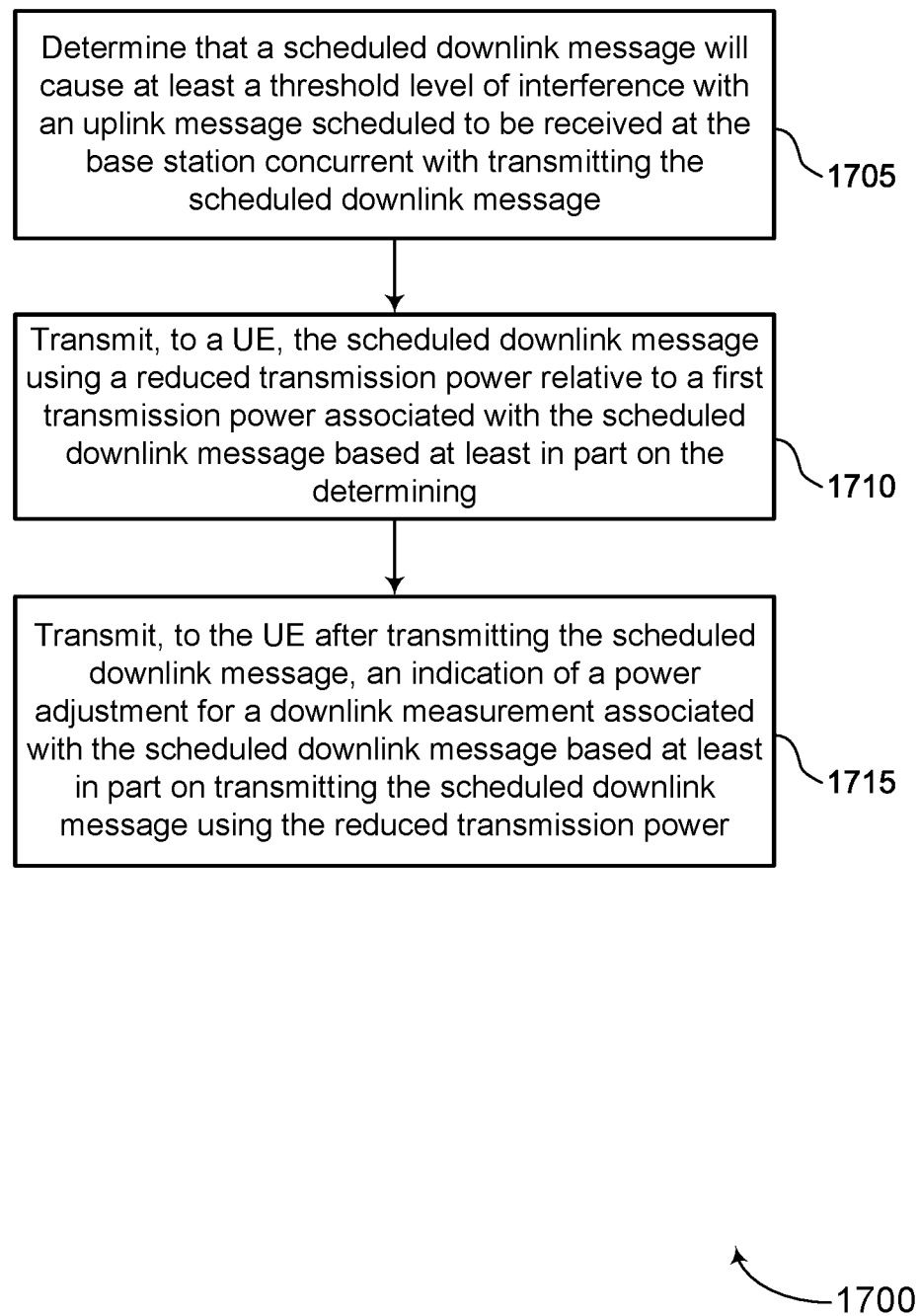

FIG. 17 shows a flowchart illustrating a method 1700 that supports procedures for indicating downlink power adjustments in accordance with aspects of the present disclosure. The operations of the method 1700 may be implemented by a base station or its components as described herein. For example, the operations of the method 1700 may be performed by a base station 105 as described with reference to FIGS. 1-4 and 9-12. In some examples, a base station may execute a set of instructions to control the functional elements of the base station to perform the described functions. Additionally or alternatively, the base station may perform aspects of the described functions using special-purpose hardware.

At 1705, the method may include determining that a scheduled downlink message will cause at least a threshold level of interference with an uplink message scheduled to be received at the base station concurrently with transmitting the scheduled downlink message. The operations of 1705 may be performed in accordance with examples as disclosed herein. In some examples, aspects of the operations of 1705 may be performed by an interference component 1125 as described with reference to FIG. 11.

At 1710, the method may include transmitting, to a UE, the scheduled downlink message using a reduced transmission power relative to a first transmission power (for example, an expected transmission power) associated with the scheduled downlink message based on the determining. The operations of 1710 may be performed in accordance with examples as disclosed herein. In some examples, aspects of the operations of 1710 may be performed by a downlink component 1130 as described with reference to FIG. 11.

At 1715, the method may include transmitting, to the UE after transmitting the scheduled downlink message, an indication of a power adjustment for a downlink measurement associated with the scheduled downlink message based on transmitting the scheduled downlink message using the reduced transmission power. The operations of 1715 may be performed in accordance with examples as disclosed herein. In some examples, aspects of the operations of 1715 may be performed by an indication component 1135 as described with reference to FIG. 11.

The following provides an overview of aspects of the present disclosure:

Aspect 1: A method for wireless communication at a base station, comprising: determining that a scheduled downlink message to a UE will cause at least a threshold level of interference with an uplink message scheduled to be received at the base station concurrently with transmitting the scheduled downlink message; transmitting, to the UE, the scheduled downlink message using a reduced transmission power relative to an expected transmission power associated with the scheduled downlink message based at least in part on the determining; and transmitting, to the UE after transmitting the scheduled downlink message, an indication of a power adjustment for a downlink measurement associated with the scheduled downlink message based at least in part on transmitting the scheduled downlink message using the reduced transmission power.

Aspect 2: The method of aspect 1, wherein the indication of the power adjustment for the downlink measurement indicates a value of a transmission power reduction from the expected transmission power to the reduced transmission power, the power adjustment for the downlink measurement corresponding to an increase of a reference signal received power measurement of one or more reference signals within the scheduled downlink message by the value of the transmission power reduction.

Aspect 3: The method of any of aspects 1 through 2, wherein the indication of the power adjustment for the downlink measurement indicates a value by which the UE is to increase a reference signal received power measurement of one or more reference signals within the scheduled downlink message, a magnitude of the value corresponding to a magnitude of a value of a transmission power reduction from the expected transmission power to the reduced transmission power.

Aspect 4: The method of any of aspects 1 through 3, wherein the indication of the power adjustment for the downlink measurement indicates an application of the power adjustment for the downlink measurement to reference signals transmitted over a quantity of most recent resource occasions prior to transmission of the indication of the power adjustment for the downlink measurement.

Aspect 5: The method of any of aspects 1 through 4, wherein the indication of the power adjustment for the downlink measurement indicates a mapping that maps the power adjustment for the downlink measurement to one or more resource occasions of a quantity of most recent resource occasions prior to transmission of the indication of the power adjustment for the downlink measurement.

Aspect 6: The method of any of aspects 1 through 5, wherein the indication of the power adjustment for the downlink measurement indicates a transmission power reduction from the expected transmission power by a value less than a threshold power, the threshold power associated with a cancellation of the scheduled downlink message.

Aspect 7: The method of any of aspects 1 through 6, wherein the indication of the power adjustment for the downlink measurement indicates a transmission power reduction from the expected transmission power by at least a threshold power, the indication of the power adjustment for the downlink measurement indicating a cancellation of the scheduled downlink message based at least in part on the expected transmission power being reduced by at least the threshold power.

Aspect 8: The method of any of aspects 1 through 7, wherein the indication of the power adjustment for the downlink measurement indicates a first reference-signal-energy-per-resource-element-to-physical-downlink-shared-channel-energy-per-resource-element ratio for the UE to use in channel estimation associated with the scheduled downlink message that is different than a second reference-signal-energy-per-resource-element-to-physical-downlink-shared-channel-energy-per-resource-element ratio associated with the scheduled downlink message.

Aspect 9: The method of aspect 8, wherein the indication of the power adjustment for the downlink measurement indicates the first reference-signal-energy-per-resource-element-to-physical-downlink-shared-channel-energy-per-resource-element ratio from a table of reference-signal-energy-per-resource-element-to-physical-downlink-shared-channel-energy-per-resource-element ratios comprising the first reference-signal-energy-per-resource-element-to-physical-downlink-shared-channel-energy-per-resource-element ratio and the second reference-signal-energy-per-resource-element-to-physical-downlink-shared-channel-energy-per-resource-element ratio.

Aspect 10: The method of any of aspects 1 through 9, wherein the indication of the power adjustment for the downlink measurement indicates an offset of a reference-signal-energy-per-resource-element-to-physical-downlink-shared-channel-energy-per-resource-element ratio associated with the scheduled downlink message.

Aspect 11: The method of any of aspects 1 through 10, wherein the indication of the power adjustment for the downlink measurement indicates an adjustment to a reference signal energy per resource element value of a reference-signal-energy-per-resource-element-to-physical-downlink-shared-channel-energy-per-resource-element ratio associated with the scheduled downlink message.

Aspect 12: The method of any of aspects 1 through 11, wherein the indication of the power adjustment for the downlink measurement indicates an adjustment to a physical downlink shared channel energy per resource element value of a reference-signal-energy-per-resource-element-to-physical-downlink-shared-channel-energy-per-resource-element ratio associated with the scheduled downlink message.

Aspect 13: The method of any of aspects 1 through 12, wherein the indication of the power adjustment for the downlink measurement is transmitted in downlink control information or a medium access control-control element.

Aspect 14: A method for wireless communication at a UE, comprising: receiving, from a base station, a downlink message having a reduced transmission power relative to an expected transmission power associated with the downlink message; receiving, from the base station and after receiving the downlink message, an indication of a power adjustment for a downlink measurement associated with the downlink message based at least in part on the downlink message having the reduced transmission power; and adjusting the downlink measurement in accordance with the indication of the power adjustment for the downlink measurement.

Aspect 15: The method of aspect 14, wherein the indication of the power adjustment for the downlink measurement indicates a value of a transmission power reduction from the expected transmission power to the reduced transmission power, wherein adjusting the downlink measurement comprises: increasing a reference signal received power measurement of one or more reference signals within the downlink message by the value of the transmission power reduction.

Aspect 16: The method of any of aspects 14 through 15, wherein adjusting the downlink measurement comprises increasing a reference signal received power measurement of one or more reference signals within the downlink message by a value indicated by the indication of the power adjustment for the downlink measurement, a magnitude of the value corresponding to a magnitude of a value of a transmission power reduction from the expected transmission power to the reduced transmission power.

Aspect 17: The method of any of aspects 14 through 16, wherein the indication of the power adjustment for the downlink measurement indicates an application of the power adjustment for the downlink measurement to reference signals received over a quantity of most recent resources prior to reception of the indication of the power adjustment for the downlink measurement, and the downlink message is received over one or more resources of the quantity of most recent resources.

Aspect 18: The method of any of aspects 14 through 17, wherein the indication of the power adjustment for the downlink measurement indicates a mapping that maps the power adjustment for the downlink measurement to one or more resources of a quantity of most recent resources prior to reception of the indication of the power adjustment for the downlink measurement.

Aspect 19: The method of any of aspects 14 through 18, wherein the indication of the power adjustment for the downlink measurement indicates a transmission power reduction from the expected transmission power by a value less than a threshold power, the threshold power associated with a cancellation of the downlink message.

Aspect 20: The method of any of aspects 14 through 19, wherein the indication of the power adjustment for the downlink measurement indicates a transmission power reduction from the expected transmission power by at least a threshold power, the indication of the power adjustment for the downlink measurement indicating a cancellation of the downlink message based at least in part on the expected transmission power being reduced by at least the threshold power.

Aspect 21: The method of any of aspects 14 through 20, further comprising refraining from triggering a compensation procedure associated with receiving the downlink message at the reduced transmission power based at least in part on adjusting the downlink measurement.

Aspect 22: The method of any of aspects 14 through 21, further comprising performing channel estimation associated with the downlink message based at least in part on adjusting the downlink measurement.

Aspect 23: The method of aspect 22, wherein the indication of the power adjustment for the downlink measurement indicates a first reference-signal-energy-per-resource-element-to-physical-downlink-shared-channel-energy-per-resource-element ratio for use in the channel estimation that is different than a second reference-signal-energy-per-resource-element-to-physical-downlink-shared-channel-energy-per-resource-element ratio associated with the downlink message.

Aspect 24: The method of aspect 23, wherein the indication of the power adjustment for the downlink measurement indicates the first reference-signal-energy-per-resource-element-to-physical-downlink-shared-channel-energy-per-resource-element ratio from a table of reference-signal-energy-per-resource-element-to-physical-downlink-shared-channel-energy-per-resource-element ratios comprising the first reference-signal-energy-per-resource-element-to-physical-downlink-shared-channel-energy-per-resource-element ratio and the second reference-signal-energy-per-resource-element-to-physical-downlink-shared-channel-energy-per-resource-element ratio.

Aspect 25: The method of any of aspects 22 through 24, wherein the indication of the power adjustment for the downlink measurement indicates an offset of a reference-signal-energy-per-resource-element-to-physical-downlink-shared-channel-energy-per-resource-element ratio associated with the downlink message, and performing the channel estimation is based at least in part on applying the offset to the reference-signal-energy-per-resource-element-to-physical-downlink-shared-channel-energy-per-resource-element ratio.

Aspect 26: The method of any of aspects 22 through 25, wherein the indication of the power adjustment for the downlink measurement indicates an adjustment to a reference signal energy per resource element value of a reference-signal-energy-per-resource-element-to-physical-downlink-shared-channel-energy-per-resource-element ratio associated with the downlink message, and performing the channel estimation is based at least in part on adjusting the reference signal energy per resource element value.

Aspect 27: The method of any of aspects 22 through 26, wherein the indication of the power adjustment for the downlink measurement indicates an adjustment to a physical downlink shared channel energy per resource element value of a reference-signal-energy-per-resource-element-to-physical-downlink-shared-channel-energy-per-resource-element ratio associated with the downlink message, and performing the channel estimation is based at least in part on adjusting the physical downlink shared channel energy per resource element value.

Aspect 28: An apparatus for wireless communication at a base station, comprising a processor; memory coupled with the processor; and instructions stored in the memory and executable by the processor to cause the apparatus to perform a method of any of aspects 1 through 13.

Aspect 29: An apparatus for wireless communication at a base station, comprising at least one means for performing a method of any of aspects 1 through 13.

Aspect 30: A non-transitory computer-readable medium storing code for wireless communication at a base station, the code comprising instructions executable by a processor to perform a method of any of aspects 1 through 13.

Aspect 31: An apparatus for wireless communication at a UE, comprising a processor; memory coupled with the processor; and instructions stored in the memory and executable by the processor to cause the apparatus to perform a method of any of aspects 14 through 27.

Aspect 32: An apparatus for wireless communication at a UE, comprising at least one means for performing a method of any of aspects 14 through 27.

Aspect 33: A non-transitory computer-readable medium storing code for wireless communication at a UE, the code comprising instructions executable by a processor to perform a method of any of aspects 14 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network device, comprising:
   determining that a scheduled downlink message to a user equipment (UE) will cause at least a threshold level of interference with an uplink message scheduled to be received at the network device concurrently with transmitting the scheduled downlink message;
   transmitting, to the UE, the scheduled downlink message using a reduced transmission power relative to an expected transmission power associated with the scheduled downlink message based at least in part on the determining; and
   transmitting, to the UE after transmitting the scheduled downlink message, an indication of a power adjustment for a downlink measurement associated with the scheduled downlink message based at least in part on transmitting the scheduled downlink message using the reduced transmission power.

2. The method of claim 1, wherein the indication of the power adjustment for the downlink measurement indicates a value of a transmission power reduction from the expected transmission power to the reduced transmission power, the power adjustment for the downlink measurement corresponding to an increase of a reference signal received power measurement of one or more reference signals within the scheduled downlink message by the value of the transmission power reduction.

3. The method of claim 1, wherein the indication of the power adjustment for the downlink measurement indicates a value by which the UE is to increase a reference signal received power measurement of one or more reference signals within the scheduled downlink message, a magnitude of the value corresponding to a magnitude of a value of a transmission power reduction from the expected transmission power to the reduced transmission power.

4. The method of claim 1, wherein the indication of the power adjustment for the downlink measurement indicates an application of the power adjustment for the downlink measurement to reference signals transmitted over a quantity of most recent resource occasions prior to transmission of the indication of the power adjustment for the downlink measurement.

5. The method of claim 1, wherein the indication of the power adjustment for the downlink measurement indicates a mapping that maps the power adjustment for the downlink measurement to one or more resource occasions of a quantity of most recent resource occasions prior to transmission of the indication of the power adjustment for the downlink measurement.

6. The method of claim 1, wherein the indication of the power adjustment for the downlink measurement indicates a transmission power reduction from the expected transmission power by a value less than a threshold power, the threshold power associated with a cancellation of the scheduled downlink message.

7. The method of claim 1, wherein the indication of the power adjustment for the downlink measurement indicates a transmission power reduction from the expected transmission power by at least a threshold power, the indication of the power adjustment for the downlink measurement indicating a cancellation of the scheduled downlink message based at least in part on the expected transmission power being reduced by at least the threshold power.

8. The method of claim 1, wherein the indication of the power adjustment for the downlink measurement indicates a first reference-signal-energy-per-resource-element-to-physical-downlink-shared-channel-energy-per-resource-element ratio for the UE to use in channel estimation associated with the scheduled downlink message that is different than a second reference-signal-energy-per-resource-element-to-physical-downlink-shared-channel-energy-per-resource-element ratio associated with the scheduled downlink message.

9. The method of claim 8, wherein the indication of the power adjustment for the downlink measurement indicates the first reference-signal-energy-per-resource-element-to-physical-downlink-shared-channel-energy-per-resource-element ratio from a table of reference-signal-energy-per-resource-element-to-physical-downlink-shared-channel-energy-per-resource-element ratios comprising the first reference-signal-energy-per-resource-element-to-physical-downlink-shared-channel-energy-per-resource-element ratio and the second reference-signal-energy-per-resource-element-to-physical-downlink-shared-channel-energy-per-resource-element ratio.

10. The method of claim 1, wherein the indication of the power adjustment for the downlink measurement indicates an offset of a reference-signal-energy-per-resource-element-to-physical-downlink-shared-channel-energy-per-resource-element ratio associated with the scheduled downlink message.

11. The method of claim 1, wherein the indication of the power adjustment for the downlink measurement indicates an adjustment to a reference signal energy per resource element value of a reference-signal-energy-per-resource-element-to-physical-downlink-shared-channel-energy-per-resource-element ratio associated with the scheduled downlink message.

12. The method of claim 1, wherein the indication of the power adjustment for the downlink measurement indicates an adjustment to a physical downlink shared channel energy per resource element value of a reference-signal-energy-per-resource-element-to-physical-downlink-shared-channel-energy-per-resource-element ratio associated with the scheduled downlink message.

13. The method of claim 1, wherein the indication of the power adjustment for the downlink measurement is transmitted in downlink control information or a medium access control-control element.

14. A method for wireless communication at a user equipment (UE), comprising:
receiving, from a network device, a downlink message having a reduced transmission power relative to an expected transmission power associated with the downlink message;
receiving, from the network device and after receiving the downlink message, an indication of a power adjustment for a downlink measurement associated with the downlink message based at least in part on the downlink message having the reduced transmission power; and
adjusting the downlink measurement in accordance with the indication of the power adjustment for the downlink measurement.

15. The method of claim 14, wherein the indication of the power adjustment for the downlink measurement indicates a value of a transmission power reduction from the expected transmission power to the reduced transmission power, wherein adjusting the downlink measurement comprises:
increasing a reference signal received power measurement of one or more reference signals within the downlink message by the value of the transmission power reduction.

16. The method of claim 14, wherein adjusting the downlink measurement comprises increasing a reference signal received power measurement of one or more reference signals within the downlink message by a value indicated by the indication of the power adjustment for the downlink measurement, a magnitude of the value corresponding to a magnitude of a value of a transmission power reduction from the expected transmission power to the reduced transmission power.

17. The method of claim 14, wherein:
the indication of the power adjustment for the downlink measurement indicates an application of the power adjustment for the downlink measurement to reference signals received over a quantity of most recent resources prior to reception of the indication of the power adjustment for the downlink measurement, and
the downlink message is received over one or more resources of the quantity of most recent resources.

18. The method of claim 14, wherein the indication of the power adjustment for the downlink measurement indicates a mapping that maps the power adjustment for the downlink measurement to one or more resources of a quantity of most recent resources prior to reception of the indication of the power adjustment for the downlink measurement.

19. The method of claim 14, wherein the indication of the power adjustment for the downlink measurement indicates a transmission power reduction from the expected transmission power by a value less than a threshold power, the threshold power associated with a cancellation of the downlink message.

20. The method of claim 14, wherein the indication of the power adjustment for the downlink measurement indicates a transmission power reduction from the expected transmission power by at least a threshold power, the indication of the power adjustment for the downlink measurement indicating a cancellation of the downlink message based at least in part on the expected transmission power being reduced by at least the threshold power.

21. The method of claim 14, further comprising refraining from triggering a compensation procedure associated with receiving the downlink message at the reduced transmission power based at least in part on adjusting the downlink measurement.

22. The method of claim 14, further comprising performing channel estimation associated with the downlink message based at least in part on adjusting the downlink measurement.

23. The method of claim 22, wherein the indication of the power adjustment for the downlink measurement indicates a first reference-signal-energy-per-resource-element-to-physical-downlink-shared-channel-energy-per-resource-element ratio for use in the channel estimation that is different than a second reference-signal-energy-per-resource-element-to-physical-downlink-shared-channel-energy-per-resource-element ratio associated with the downlink message.

24. The method of claim 23, wherein the indication of the power adjustment for the downlink measurement indicates the first reference-signal-energy-per-resource-element-to-physical-downlink-shared-channel-energy-per-resource-element ratio from a table of reference-signal-energy-per-resource-element-to-physical-downlink-shared-channel-energy-per-resource-element ratios comprising the first reference-signal-energy-per-resource-element-to-physical-downlink-shared-channel-energy-per-resource-element ratio and the second reference-signal-energy-per-resource-element-to-physical-downlink-shared-channel-energy-per-resource-element ratio.

25. The method of claim 22, wherein:
the indication of the power adjustment for the downlink measurement indicates an offset of a reference-signal-energy-per-resource-element-to-physical-downlink-shared-channel-energy-per-resource-element ratio associated with the downlink message, and
performing the channel estimation is based at least in part on applying the offset to the reference-signal-energy-per-resource-element-to-physical-downlink-shared-channel-energy-per-resource-element ratio.

26. The method of claim 22, wherein:
the indication of the power adjustment for the downlink measurement indicates an adjustment to a reference signal energy per resource element value of a reference-signal-energy-per-resource-element-to-physical-downlink-shared-channel-energy-per-resource-element ratio associated with the downlink message, and
performing the channel estimation is based at least in part on adjusting the reference signal energy per resource element value.

27. The method of claim 22, wherein:
the indication of the power adjustment for the downlink measurement indicates an adjustment to a physical downlink shared channel energy per resource element value of a reference-signal-energy-per-resource-element-to-physical-downlink-shared-channel-energy-per-resource-element ratio associated with the downlink message, and
performing the channel estimation is based at least in part on adjusting the physical downlink shared channel energy per resource element value.

28. An apparatus for wireless communication at a network device, comprising:
one or more processors;
one or more memories coupled with the one or more processors; and
one or more processor-readable instructions stored in the one or more memories and executable by the one or more processors to cause the apparatus to:

determine that a scheduled downlink message to a user equipment (UE) will cause at least a threshold level of interference with an uplink message scheduled to be received at the network device concurrently with transmitting the scheduled downlink message;

transmit, to the UE, the scheduled downlink message using a reduced transmission power relative to an expected transmission power associated with the scheduled downlink message based at least in part on the determining; and transmit, to the UE after transmitting the scheduled downlink message, an indication of a power adjustment for a downlink measurement associated with the scheduled downlink message based at least in part on transmitting the scheduled downlink message using the reduced transmission power.

29. The apparatus of claim 28, wherein the indication of the power adjustment for the downlink measurement indicates a value of a transmission power reduction from the expected transmission power to the reduced transmission power, the power adjustment for the downlink measurement corresponding to an increase of a reference signal received power measurement of one or more reference signals within the scheduled downlink message by the value of the transmission power reduction.

30. An apparatus for wireless communication at a user equipment (UE), comprising:

one or more processors;

one or more memories coupled with the one or more processors; and one or more processor-readable instructions stored in the one or more memories and executable by the one or more processors to cause the apparatus to:

receive, from a network device, a downlink message having a reduced transmission power relative to an expected transmission power associated with the downlink message;

receive, from the network device and after receiving the downlink message, an indication of a power adjustment for a downlink measurement associated with the downlink message based at least in part on the downlink message having the reduced transmission power; and adjust the downlink measurement in accordance with the indication of the power adjustment for the downlink measurement.

* * * * *